United States Patent
Nakagawa

(10) Patent No.: US 8,090,124 B2
(45) Date of Patent: Jan. 3, 2012

(54) GASKET MEMBER, DIAPHRAGM, FLAT PANEL SPEAKER, METHOD OF MOUNTING SAME FLAT PANEL SPEAKER, AND METHOD OF ASSEMBLING ELECTRONIC DEVICE

(75) Inventor: Takahiro Nakagawa, Saitama (JP)

(73) Assignee: NEC Corporation, Tokyo (JP)

( * ) Notice: Subject to any disclaimer, the term of this patent is extended or adjusted under 35 U.S.C. 154(b) by 1298 days.

(21) Appl. No.: 11/317,034

(22) Filed: Dec. 23, 2005

(65) Prior Publication Data

US 2006/0140439 A1   Jun. 29, 2006

(30) Foreign Application Priority Data

Dec. 27, 2004   (JP) ................................. 2004-377157

(51) Int. Cl.
H04R 25/00   (2006.01)
(52) U.S. Cl. ........................................ 381/152; 381/431
(58) Field of Classification Search .................. 381/152, 381/306, 333, 365, 388, 431, 392; 277/596, 277/598, 630; 455/575.1
See application file for complete search history.

(56) References Cited

U.S. PATENT DOCUMENTS

| | | | | |
|---|---|---|---|---|
| 4,959,008 | A * | 9/1990 | Wasulko | 428/40.7 |
| 6,081,421 | A * | 6/2000 | Markow et al. | 361/679.09 |
| 6,660,389 | B2 * | 12/2003 | Liu et al. | 428/421 |
| 7,283,637 | B2 * | 10/2007 | Suzuki et al. | 381/152 |
| 7,570,771 | B2 * | 8/2009 | Whitwell et al. | 381/152 |
| 2005/0002537 | A1 * | 1/2005 | Azima et al. | 381/152 |
| 2005/0286729 | A1 * | 12/2005 | Harwood et al. | 381/152 |
| 2006/0140437 | A1 * | 6/2006 | Watanabe et al. | 381/431 |
| 2006/0140438 | A1 * | 6/2006 | Kimura et al. | 381/431 |
| 2006/0198541 | A1 * | 9/2006 | Henry | 381/152 |
| 2009/0103767 | A1 * | 4/2009 | Kuroda et al. | 381/388 |

FOREIGN PATENT DOCUMENTS

| | | |
|---|---|---|
| GB | 2343811 | 5/2000 |
| GB | 2369901 | 10/2001 |
| JP | 2002-533657 | 10/2002 |
| JP | 2003120816 A * | 4/2003 |

OTHER PUBLICATIONS

"Nikkei Business", Nikkei Business Publication Inc., Nov. 1, 2004, p. 90.
Office Action dated Mar. 4, 2008, Japanese Patent Application No. 2004-377157 (with English translation of relevant portions).
Extended European Search Report and Opinion, European Patent Application No. 05090357.4, dated Apr. 26, 2011.

* cited by examiner

Primary Examiner — Curtis Kuntz
Assistant Examiner — Ryan Robinson
(74) Attorney, Agent, or Firm — Michael Best & Friedrich LLP

(57) ABSTRACT

A method of mounting a flat panel speaker is provided which is capable of reliably preventing entry of dust and of shortening assembling time. By bonding a gasket member to a diaphragm, by pasting a separator to a gasket member side opposite to the diaphragm and, by sandwiching the diaphragm and the gasket member from both sides, a gasket-attached diaphragm is fabricated. After peeling off a protecting sheet on a rear side of the gasket-attached diaphragm, the actuator module is bonded to the diaphragm. Then, after peeling the separator from the gasket-attached diaphragm, positioning is performed on the diaphragm and the gasket member is bonded to a putting-face of the front case. The entry of dust into a region corresponding to a liquid crystal display panel is blocked by a partitioning portion of the gasket member.

6 Claims, 16 Drawing Sheets

GASKET MEMBER, DIAPHRAGM, FLAT PANEL SPEAKER, METHOD OF MOUNTING SAME FLAT PANEL SPEAKER, AND METHOD OF ASSEMBLING ELECTRONIC DEVICE

The present application claims priority of Japanese Patent Application No. 2004-377157 filed on Dec. 27, 2004, which is hereby incorporated by reference.

BACKGROUND OF THE INVENTION

1. Field of the Invention

The present invention relates to a gasket member, a diaphragm, a flat panel speaker, a method of mounting the same flat panel speaker, and a method of assembling an electronic device, and more particularly to the method of mounting the flat panel speaker in a cabinet of a portable electronic device such as a foldable portable cellular phone or a like, the method of assembling the electronic device having the flat panel speaker, the gasket member to be used for the flat panel speaker and also serving as, for example, a screen component to protect a display panel and to support a diaphragm to emit a voice and to be used for prevention of the entry of a foreign matter such as dust or a like into the cabinet, the gasket-attached diaphragm constructed by attaching the gasket member to the diaphragm, and the flat panel speaker having the diaphragm and an actuator to vibrate the diaphragm.

2. Description of the Related Art

In recent years, due to high versatility of being usable even during movement of a user or while on a road, a portable electronic device such as a portable cellular phone is now in widespread use. Popularity has been gained by many users to a foldable and freely opened-closed type portable cellular phone, in particular, since the portable cellular phone can be housed in a compact state. The foldable portable cellular phone has become commercially practical which is so configured that, by using a two-axle hinge, one cabinet is allowed to freely rotate relative to another cabinet in a portion surrounding a rotational shaft mounted in a direction perpendicular to a rotational shaft used to open or close the cabinet.

In a portable cellular phone 101, as shown in FIGS. 14 and 15, an upper unit 102 and lower unit 103 are connected to each other by a two-axle hinge 104 and, on an upper cabinet 105 of the upper unit 102 are mounted a speaker section 106 to output a received voice and a display section 107 made up of a liquid crystal display device and, on a lower cabinet 108 of the lower unit 103 are mounted an operating section 109 made up of various operational keys, a microphone section 110 to receive a transmitting voice, and a voice outputting section 111 having a speaker.

Moreover, the display section 107, as shown in FIG. 16, has a liquid crystal display panel 112 and a backlight to supply illuminating light to the liquid crystal display panel 112, all of which are held by a holding frame 113 and are housed in the upper cabinet 105. Also, a screen component 114 to protect the liquid crystal display panel 112 is bonded to a front case 115 by using a double-faced adhesive sheet 116.

The portable cellular phone 101 having, in addition to its original telephone conversation function, a data communication function of receiving and transmitting electronic mail and/or of being connected to the Internet to browse home pages is widely used.

In the portable cellular phone 101 described above, for example, when a user executes a program downloaded from a site to enjoy a game, in order to hear a voice while seeing a screen of the display section 107, the portable cellular phone 101 is used with its cabinets opened.

However, the conventional portable cellular phone 101 has a problem. That is, when a user views a display screen of the display section 107 in a state in which the portable cellular phone is folded in a compact manner with the display screen faced toward a front, the user cannot hear a voice satisfactorily since a speaker of the voice outputting section 111 is hidden. Moreover, a user, when carrying out a telephone conversation, puts the speaker section 106 to his/her user's ear with the cabinet being opened, however, since a voice hole of the speaker section 106 is comparatively small, it is difficult for the user to put the voice hole on the ear exactly and the portable cellular phone 101 is displaced from a position of the voice hole, causing an insufficient amount of a voice and an unclear voice.

To solve this problem, in recent years, technology is proposed to be applied to a portable cellular phone (for voice outputting from a display screen, see Non-patent reference 1: "Nikkei Business", the Nov. 1, 2004, Nikkei Business Publication Inc., p. 90) in which, for example, a screen component used to protect a display panel of a personal computer is to be used as a diaphragm making up a flat panel speaker of the portable cellular phone.

The flat panel speaker 201 employed in the conventional portable cellular phone 101 is mounted in a cabinet having a display section and, as shown in FIG. 17, is made of a transparent material of, for example, an acrylic resin and includes a diaphragm 202 also serving as a screen component to protect the liquid crystal display panel 112 and an actuator module 203 having a piezo-electric element which vibrates the diaphragm 202 for emission of sound waves.

The diaphragm 202, in its specified portion, is attached to the actuator module 203 so that vibrations are transferred from the actuator module 203 in a manner in which the diaphragm 202 strikes the actuator module 203 to come into physical contact and also is attached to the front case 115 making up another cabinet and having an aperture in its central portion to expose a display screen of the liquid crystal display panel 112 with the frame-shaped gasket member 204 used to prevent the entry of a foreign matter such as dust or a like interposed between the diaphragm 202 and the front case 115. The gasket member 204 is placed so as to surround the aperture of the front case 115 and is bonded, by using a frame-like double-faced adhesive sheet, to the diaphragm 202 and to a portion surrounding the aperture of the front case 115 respectively. Moreover, inside of the gasket member 204 is placed a frame-shaped dust preventing cushion component 205 to prevent the entry of dust into inside portions and to avoid the adhesion of dust to a surface of the liquid crystal display panel 112.

To mount the flat panel speaker 201 on the cabinet of the portable cellular phone 101, as the first step, the gasket member 204 is bonded to a circumferential portion of a rear of the diaphragm 202 by using the frame-like double-faced adhesive sheet and the double-faced adhesive sheet is pasted to a side of the gasket member 204 opposite to the diaphragm 202 and the gasket member 204 and the diaphragm 202 are sandwiched by a pair of protecting sheets from both sides to fabricate the gasket-attached diaphragm. Next, the protecting sheet on a rear side of the gasket-attached diaphragm is peeled off and the actuator module 203 is bonded to a specified portion of a rear of the diaphragm 202 by using, for example, a double-faced adhesive tape. Thereafter, on a rear side of the gasket-attached diaphragm is pasted an aperture-formed protecting sheet used to expose the actuator module 203.

Then, the aperture-formed protecting sheet on a rear side of the gasket-attached diaphragm is peeled off and, after positioning is performed on the diaphragm 202 relative to the position of the front case 115, the gasket member 204 is bonded to an edge of the aperture of the front case 115 using the double-faced adhesive sheet to attach the diaphragm 202 to a circumferential portion of the aperture of the front case 115. The dust preventing cushion component 205 is attached, in advance, to the holding frame 113 of the liquid crystal display panel 112 so as to be placed in a portion surrounding the liquid crystal display panel 112 and further a rear cover is assembled to be attached thereto. The front case 115 to which the diaphragm 202, actuator module 203, gasket member 204, or a like are attached and the rear cover to which the liquid crystal display panel 112, dust preventing cushion component 205, printed circuit board are attached are assembled together to be attached to each other.

The first problem to be solved is that, during a period from the process of attaching the actuator module to the diaphragm to the process of attaching the diaphragm to the front case, due to insufficient prevention of dust, dust enters from an aperture of the aperture-formed protecting sheet, causing the adhesion of dust to, for example, the diaphragm serving also as the screen component, which adversely affects an acoustic characteristic of the flat panel speaker and degrades displaying quality of the liquid crystal display panel.

The second problem to be solved is that peeling and re-pasting of the protecting sheet take much time and labor. That is, in the process of attaching the actuator module to the diaphragm, after the protecting sheet on the rear side of the gasket-attached diaphragm is peeled off, the actuator module is bonded to the rear of the diaphragm and, thereafter, additional following processes are required in which another aperture-formed protecting sheet having an aperture to expose the actuator module 203 is further pasted for prevention of dust to the rear side of the gasket-attached diaphragm to attach the diaphragm to the front case.

SUMMARY OF THE INVENTION

In view of the above, it is a first object of the present invention to provide a method of mounting a flat panel speaker which is capable of performing reliable prevention of dust to maintain a favorable acoustic characteristic of the flat panel speaker and excellent displaying quality of a display panel, a method of assembling an electronic device having the flat panel speaker, a gasket member, a diaphragm, and the flat panel speaker.

It is a second object of the present invention to provide a method of mounting the flat panel speaker which is capable of shortening mounting time to perform a rapid assembling process, a method of assembling the electronic device having the flat panel speaker, the gasket member, the diaphragm, and the flat panel speaker.

According to a first aspect of the present invention, there is provided a method of mounting a flat panel speaker to emit sound waves by making an actuator vibrate a diaphragm on a cabinet of an electronic device in which an aperture is formed with a gasket member to prevent entry of a foreign matter including dust into the cabinet from the aperture being interposed between the flat panel speaker and the cabinet, the method including:

a first step of preparing a gasket-attached diaphragm having the gasket member bonded to a rear face of the diaphragm to which a separator is pasted, in a manner to be peeled off, that has a passing-through hole to allow the actuator to pass through, which is formed on a side opposite to a side of the gasket member on which the diaphragm is placed and of inserting the actuator from the passing-through hole to bond the actuator to a specified portion of the rear face of the diaphragm; and a second step of attaching the diaphragm to the cabinet after peeling off the separator of the gasket-attached diaphragm and after bonding the gasket member to an edge of the aperture with the gasket member being interposed between the diaphragm and the cabinet in a manner to cover the aperture;

wherein, in the first step, the gasket member is used which has a frame-like portion to support the diaphragm and a partitioning portion bridging specified portions of the frame-like portion facing each other which partitions a region surrounded by the frame-like portion into a first region and a second region through which the actuator is made to pass and the separator is pasted to the diaphragm so that the passing-through hole is placed on a side opposite to a side where the diaphragm in the second region is placed; and wherein, during a period between the first step and the second step, the first region is surrounded by the diaphragm, the separator, the frame-like portion, and the partitioning portion, which prevents entry of the foreign matter from the passing-through hole into the first region.

In the foregoing first aspect, a preferable mode is one wherein the gasket-attached diaphragm is used which is fabricated by bonding the gasket member to a rear face of the diaphragm and, after pasting the separator on a side opposite to a side of the gasket member where the diaphragm is placed, by bonding a first protecting sheet to a rear face of the separator in a manner to cover at least the passing-through hole and to be able to be peeled off and by bonding a second protecting sheet to a surface of the diaphragm in a manner to cover the surface and to be able to be peeled off and, after peeling off the first protecting sheet of the gasket-attached diaphragm, the actuator is inserted through the passing-through hole to be bonded to the diaphragm.

Also, a preferable mode is one wherein, in the first step, the gasket member is bonded, by using a first frame-like double-faced adhesive sheet interposed between the gasket member and the diaphragm, to a rear face of the diaphragm and the separator is pasted, by using a second double-faced adhesive sheet interposed between the separator and the gasket member, to a side opposite to a side of the gasket member where the diaphragm is placed.

Also, a preferable mode is one wherein the gasket member, with the gasket member being bonded to the diaphragm, supports the diaphragm while the gasket member is being deformed at least along a thickness direction according to the vibration of the diaphragm.

Also, a preferable mode is one wherein the actuator has a piezo-electric element and is in contact with a specified portion of the diaphragm.

Also, a preferable mode is one wherein the electric device has a display unit to display character information or image information and the diaphragm is made of a transparent material and also serves as a screen component to protect a display screen of the display unit.

According to a second aspect of the present invention, there is provided a method of assembling an electronic device having the flat panel speaker to emit sound waves by making the actuator vibrate the diaphragm including:

mounting the flat panel speaker using a method of mounting a flat panel speaker to emit sound waves by making an actuator vibrate a diaphragm on a cabinet of an electronic device in which an aperture is formed with a gasket member to prevent entry of a foreign matter including dust into the cabinet from the aperture being interposed between the flat panel speaker and the cabinet, the method including:

a first step of preparing a gasket-attached diaphragm having the gasket member bonded to a rear face of the diaphragm to which a separator is pasted, in a manner to be peeled off, that has a passing-through hole to allow the actuator to pass through, which is formed on a side opposite to a side of the gasket member on which the diaphragm is placed and of inserting the actuator from the passing-through hole to bond the actuator to a specified portion of the rear face of the diaphragm; and a second step of attaching the diaphragm to the cabinet after peeling off the separator of the gasket-attached diaphragm and after bonding the gasket member to an edge of the aperture with the gasket member being interposed between the diaphragm and the cabinet in a manner to cover the aperture;

wherein, in the first step, the gasket member is used which has a frame-like portion to support the diaphragm and a partitioning portion bridging specified portions of the frame-like portion facing each other which partitions a region surrounded by the frame-like portion into a first region and a second region through which the actuator is made to pass and the separator is pasted to the diaphragm so that the passing-through hole is placed on a side opposite to a side where the diaphragm in the second region is placed; and wherein, during a period between the first step and the second step, the first region is surrounded by the diaphragm, the separator, the frame-like portion, and the partitioning portion, which prevents entry of the foreign matter from the passing-through hole into the first region.

According to a third aspect of the present invention, there is provided a gasket member to be used for prevention of entry of a foreign matter from an aperture formed in a cabinet of an electronic device into the cabinet when a flat panel speaker to emit sound waves by making an actuator vibrate a diaphragm is mounted in the cabinet, including:

a frame-like portion to support the diaphragm;

a beam-shaped partitioning portion bridging specified portions facing each other of the frame-like portion to partition a region surrounded by the frame-like portion into a first region and a second region where the actuator is made to pass through, wherein, when the diaphragm is attached to the cabinet, the gasket member is bonded to a rear face of the diaphragm and a separator having a passing-through hole to allow the actuator to pass through formed in a specified position is pasted to a side of the gasket member opposite to a side where the diaphragm is placed so that the passing-through hole is placed on a side opposite to a side where the diaphragm of the second region is placed and so that the separator is able to be peeled off, which makes up a gasket-attached diaphragm and the actuator is inserted from the passing-throughhole to be bonded to a specified position of a rear face of the diaphragm;

wherein the separator of the gasket-attached diaphragm is peeled off and the gasket member is bonded to an edge of the aperture and the diaphragm is attached to the cabinet with the gasket member interposed between the diaphragm and the cabinet in a manner to cover the aperture; and wherein, during a period from the process of attaching the actuator to the diaphragm to the process of attaching the diaphragm to the cabinet, the first region is surrounded by the diaphragm, the separator, the frame-like portion, and the partitioning portion, which prevents entry of the foreign matter from the passing-through hole into the first region.

In the foregoing third aspect, a preferable mode is one wherein the gasket member, with the gasket member being bonded to the diaphragm, supports the diaphragm while the gasket member is being deformed at least along a thickness direction according to the vibration of the diaphragm.

According to a fourth aspect of the present invention, there is provided a gasket member-attached diaphragm constructed by bonding a gasket member used to prevent entry of a foreign matter including dust from an aperture into a cabinet, when a flat panel speaker is mounted in the cabinet of an electronic device in which the aperture is formed, to a diaphragm making up the flat-panel speaker to emit sound waves by making an actuator vibrate a diaphragm, including:

the diaphragm;

a frame-like portion to support the diaphragm;

a beam-shaped partitioning portion bridging specified portions facing each other of the frame-like portion to partition a region surrounded by the frame-like portion into a first region and a second region through which the actuator is made to pass;

the gasket member bonded to a rear face of the diaphragm;

a separator having a passing-through hole to allow the actuator to pass through which is formed in its specified position to be pasted to a side of the gasket member opposite to a side where the diaphragm is placed so that the passing-through hole is placed on a side opposite to a side where the diaphragm of the second region is placed and so that the separator is able to be peeled off, wherein, when the flat panel speaker is mounted in the cabinet, the actuator is inserted from the passing-through hole to be bonded to a specified portion of a rear face of the diaphragm;

wherein the separator of the gasket member-attached diaphragm is peeled off and the gasket member is bonded to an edge of the aperture and the diaphragm is attached to the cabinet with the gasket member interposed between the diaphragm and the cabinet so that the diaphragm covers the aperture; and wherein, during a period from the process of attaching the actuator to the diaphragm to the process of attaching the diaphragm to the cabinet, the first region is surrounded by the diaphragm, the separator, the frame-like portion, and the partitioning portion, which prevents entry of the foreign matter from the passing-through hole into the first region.

In the foregoing fourth aspect, a preferable mode is one that wherein further includes a first protecting sheet bonded to a rear face of the separator so as to cover at least the passing-through hole and so as to be able to be peeled off and a second protecting sheet bonded to a surface of the diaphragm to cover the surface and so as to be able to be peeled off, wherein, when the flat panel speaker is mounted in the cabinet, the first protecting sheet is peeled from the gasket member-attached diaphragm and the actuator is inserted from the passing-through hole to be bonded to the diaphragm.

Also, a preferable mode is one wherein the gasket member is bonded to a rear face of the diaphragm by using a first frame-like double-faced adhesive sheet interposed between the gasket member and the diaphragm and the separator is bonded to a side of the gasket member opposite to a side where the diaphragm is placed by using a second double-faced adhesive sheet interposed between the diaphragm and the separator.

Also, a preferable mode is one wherein the gasket member, with the gasket member being bonded to the diaphragm, supports the diaphragm while the gasket member is being deformed at least along a thickness direction according to the vibration of the diaphragm.

Also, a preferable mode is one wherein the electric device has a display unit to display character information or image information and the diaphragm is made of a transparent material and also serves as a screen component to protect a display screen of the display unit.

According to a fifth aspect of the present invention, there is provided a flat panel speaker suitable for being mounted in a cabinet of an electronic device having an aperture formed in the cabinet for emitting sound waves by making an actuator vibrate a diaphragm, including:

the diaphragm;

a frame-like portion to support the diaphragm;

a partitioning portion bridging specified portions facing each other of the frame-like portion to partition a region surrounded by the frame-like portion into a first region and a second region through which the actuator is made to pass;

a gasket member bonded to a rear face of the diaphragm and used to prevent entry of a foreign matter including dust from the aperture into the cabinet;

a separator having a passing-through hole to allow the actuator to pass through which is formed in its specified position to be pasted to a side of the gasket member opposite to a side where the diaphragm is placed so that the passing-through hole is placed on a side opposite to a side of the second region where the diaphragm is placed and so that the separator is able to be peeled off;

the actuator inserted from the passing-through hole and bonded to a specified portion of a rear face of the diaphragm;

wherein, when the flat panel speaker is mounted in the cabinet, the separator is peeled off and the gasket member is bonded to an edge of the aperture and the diaphragm is attached to the cabinet with the gasket member interposed between the diaphragm and the cabinet;

wherein, during a period from the process of attaching the actuator to the diaphragm to the process of attaching the diaphragm to the cabinet, the first region is surrounded by the diaphragm, the separator, the frame-like portion, and the partitioning portion, which prevents entry of the foreign matter from the passing-through hole into the first region.

In the foregoing fifth aspect, a preferable mode is one that wherein further includes a protecting sheet bonded to a surface of the diaphragm in a manner to cover the surface and to be able to be peeled off, wherein, when the flat panel speaker is mounted in the cabinet, the separator is peeled off and the gasket member is bonded to an edge of the aperture and the diaphragm is attached to the cabinet with the gasket member interposed between the diaphragm and the cabinet in a manner to cover the aperture.

Also, a preferable mode is one wherein the gasket member is bonded to a rear face of the diaphragm by using a first frame-like double-faced adhesive sheet interposed between the gasket member and the diaphragm and the separator is bonded to a side being opposite to a side of the gasket member where the gasket member-attached diaphragm is placed by using a second double-faced adhesive sheet interposed between the diaphragm and the separator.

Also, a preferable mode is one wherein the gasket member, with the gasket member being bonded to the diaphragm, supports the diaphragm while the gasket member is being deformed at least along a thickness direction according to the vibration of the diaphragm.

Also, a preferable mode is one wherein the actuator has a piezo-electric element and is in contact with a specified portion of the diaphragm.

Furthermore, a preferable mode is one wherein the electric device has a display unit to display character information or image information and the diaphragm is made of a transparent material and also serves as a screen component to protect a display screen of the display unit.

With the above configuration, during a period from the first process of attaching the actuator module to the diaphragm to the second process of attaching the diaphragm to the cabinet, even if a foreign matter such as dust or a like enters the cabinet from the passing-through hole of the separator, the entry is blocked by the partitioning portion of the gasket member to reliably prevent the entry of dust, thus enabling a favorable characteristic of the flat panel speaker and an excellent displaying quality of a display panel to be maintained.

In the second process of attaching the diaphragm to the cabinet following the first process of attaching the actuator module to the diaphragm, all that has to be done is to peel off the separator and to perform positioning for attachment and, therefore, unlike in the conventional technology, peeling off and re-pasting of the protecting sheet are not necessary, which enables shortening of assembling work time and rapid assembling, thus reducing cost.

BRIEF DESCRIPTION OF THE DRAWINGS

The above and other objects, advantages, and features of the present invention will be more apparent from the following description taken in conjunction with the accompanying drawings in which.

DETAITED DESCRIPTION OF THE PREFERRED EMBODIMENT

Best modes of carrying out the present invention will be described in further detail using various embodiments with reference to the accompanying drawings.

A first object of the present invention that an excellent acoustic characteristic of a flat panel speaker and excellent quality of a display panel can be maintained is achieved by reliably preventing entry of dust into a first region by using a partitioning portion of a gasket member even if a foreign matter such as the dust or a like enters from a passing-through port of a separator while a first process of attaching an actuator to a diaphragm is moved to a second process of attaching the diaphragm to a cabinet.

Moreover, a second object of the present invention that assembling work time is to be shortened to rapidly assemble a portable cellular phone is achieved simply by performing positioning for attachment of the diaphragm to the cabinet after the separator is peeled off, unlike in the case of the conventional technology, neither peeling-off of a protecting sheet nor its re-pasting are required.

Embodiment

Figure 1:
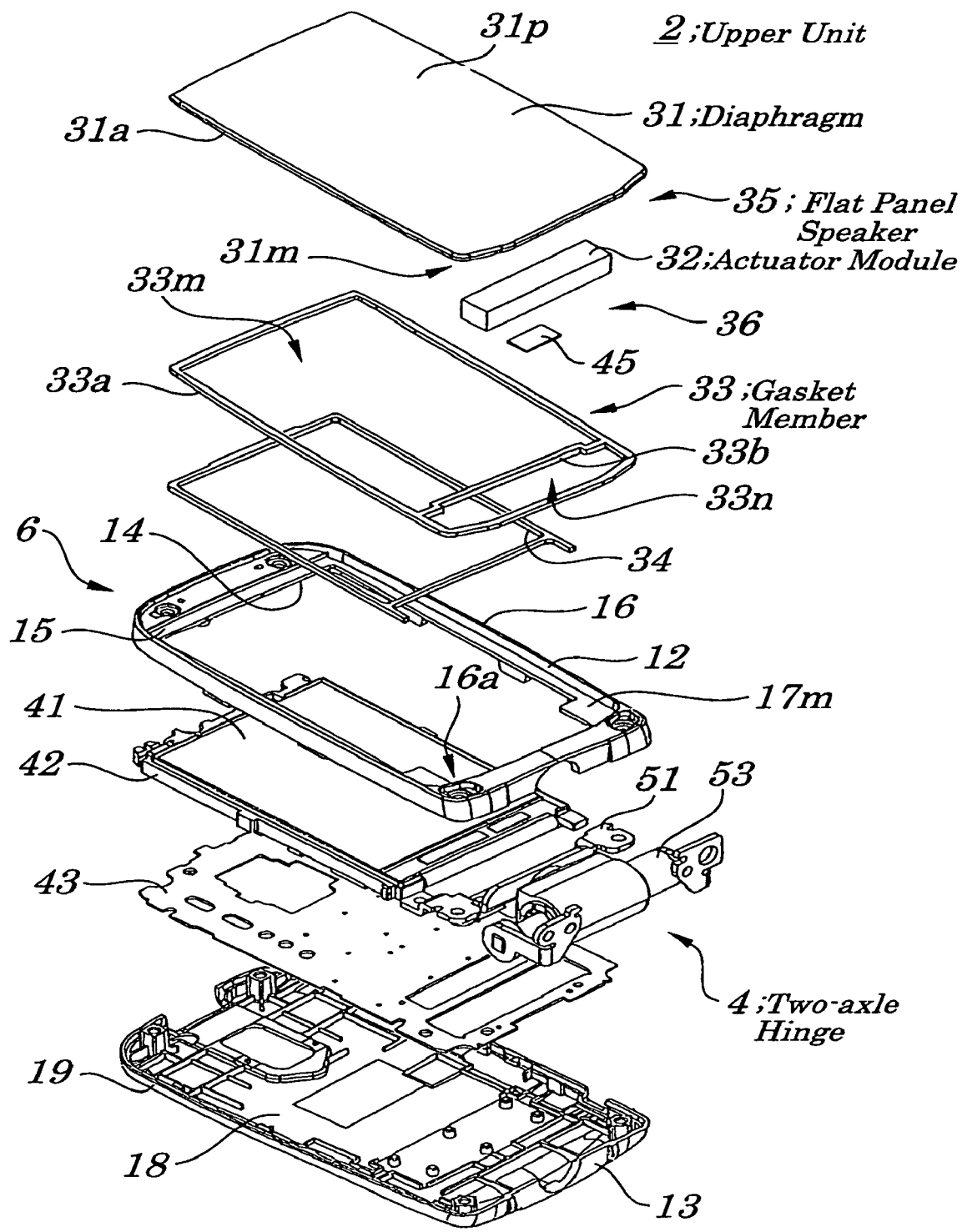
FIG. 1 is an exploded perspective view showing configurations of an upper unit obtained by disassembling the upper unit of a portable cellular phone and by viewing the upper unit from its front side according to an embodiment of the present invention.
Figure 2:
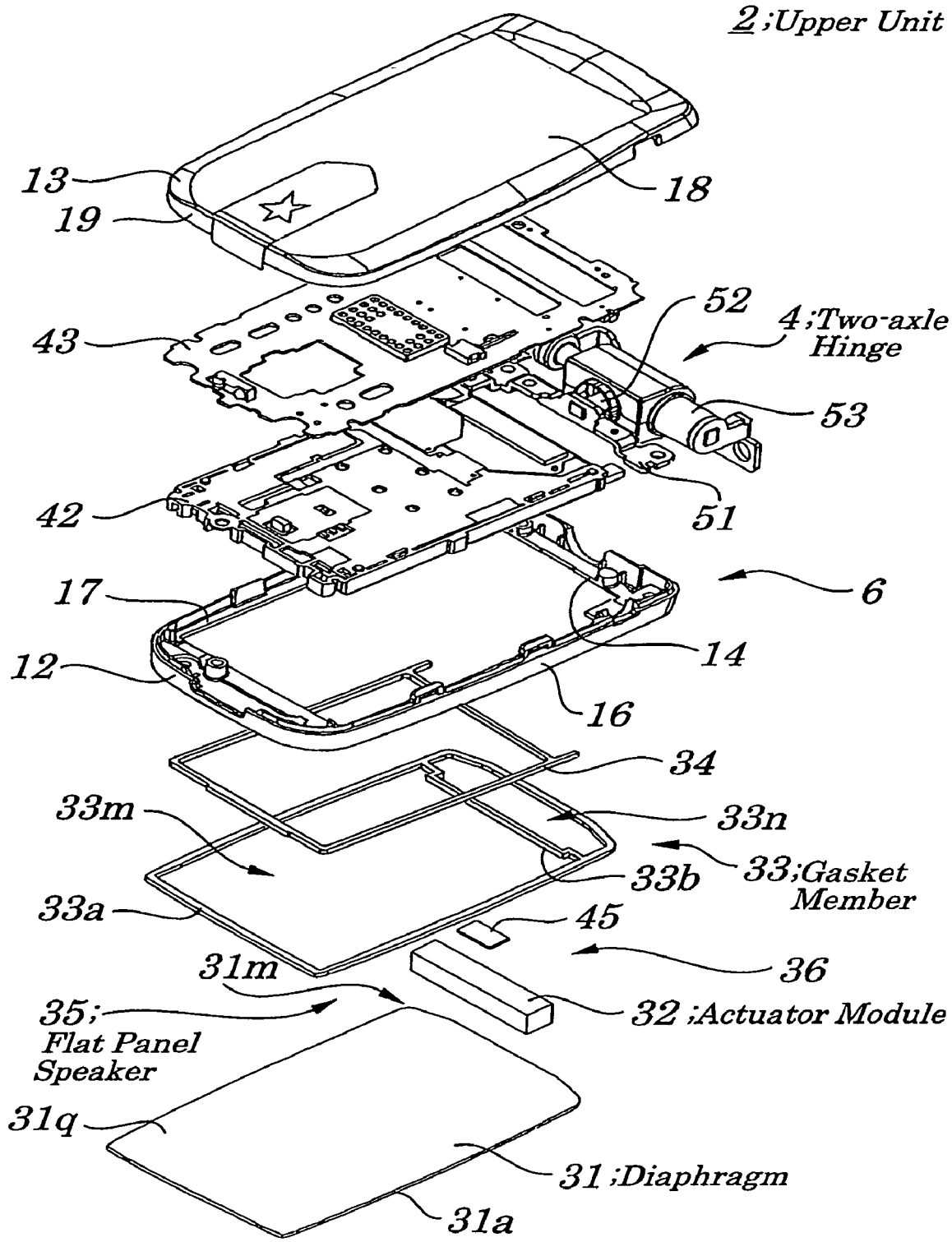
FIG. 2 is another exploded perspective view for showing configurations of the upper unit obtained by disassembling the upper unit of the portable cellular phone and by viewing the upper unit from its rear side according to the embodiment of the present invention.
Figure 3:
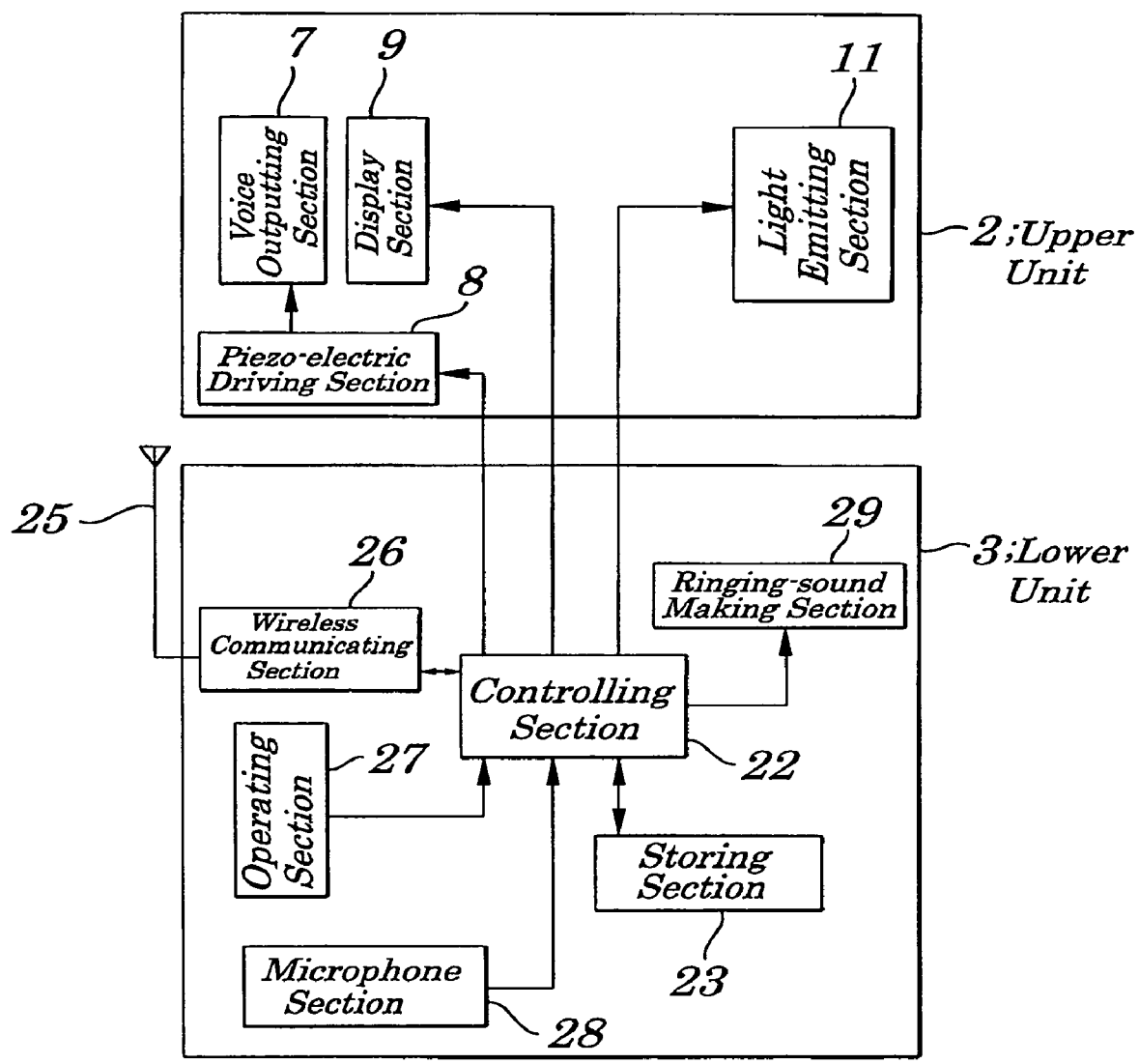
FIG. 3 is a block diagram showing configurations of the portable cellular phone according to the embodiment of the present invention.
Figure 4:
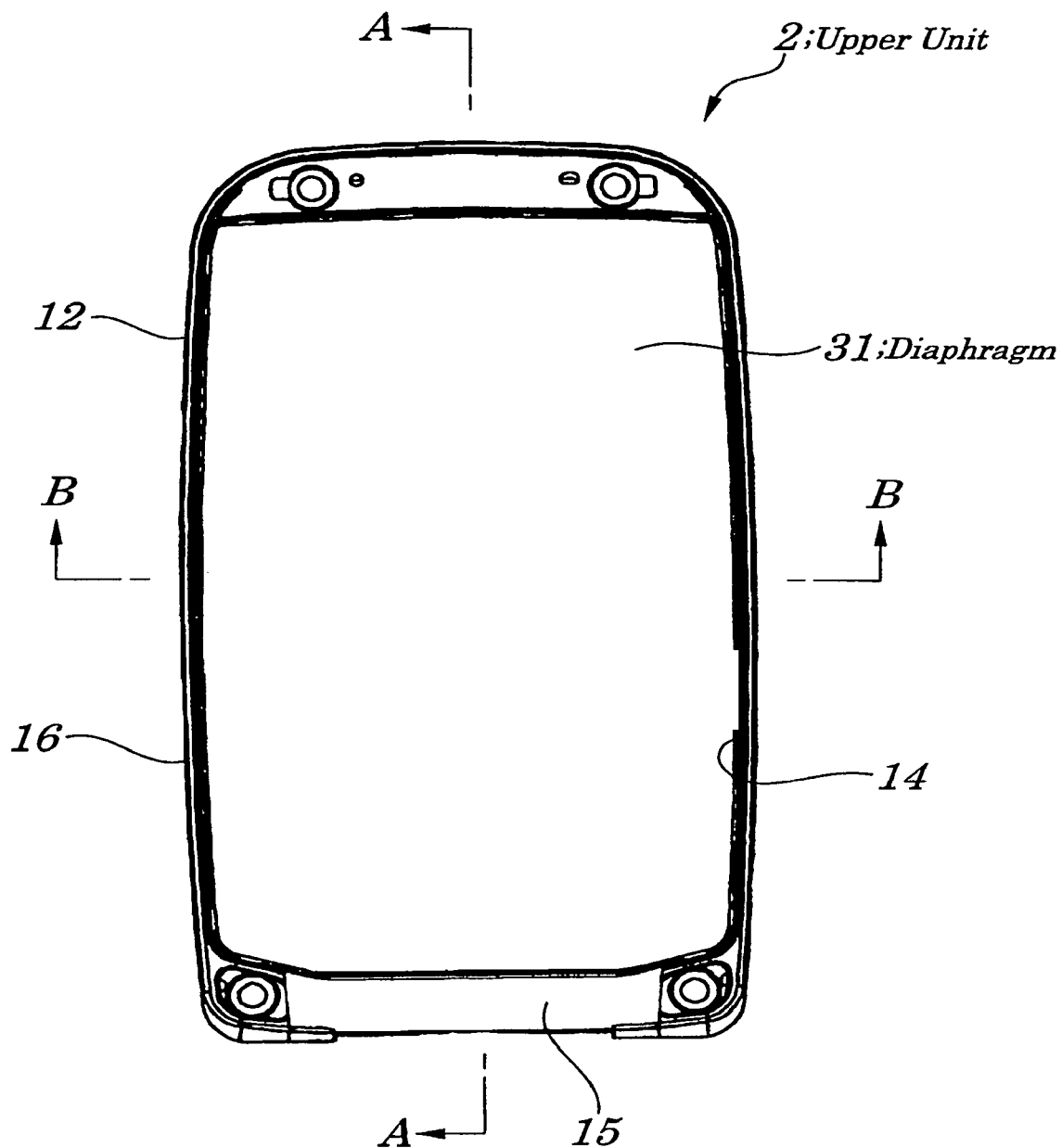
FIG. 4 is a plane view showing configurations of the upper unit of the portable cellular phone according to the embodiment of the present invention.
Figure 5:
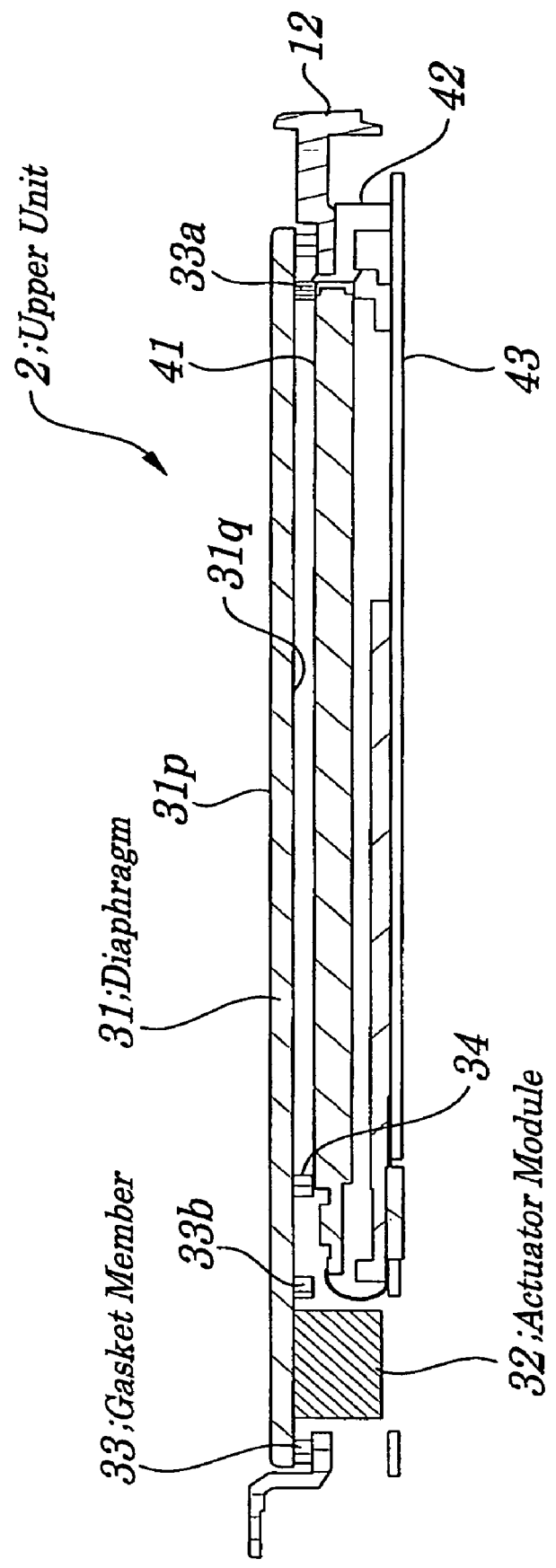
FIG. 5 is a cross-sectional view of the upper unit, taken along a line A-A of FIG. 4.
Figure 6:
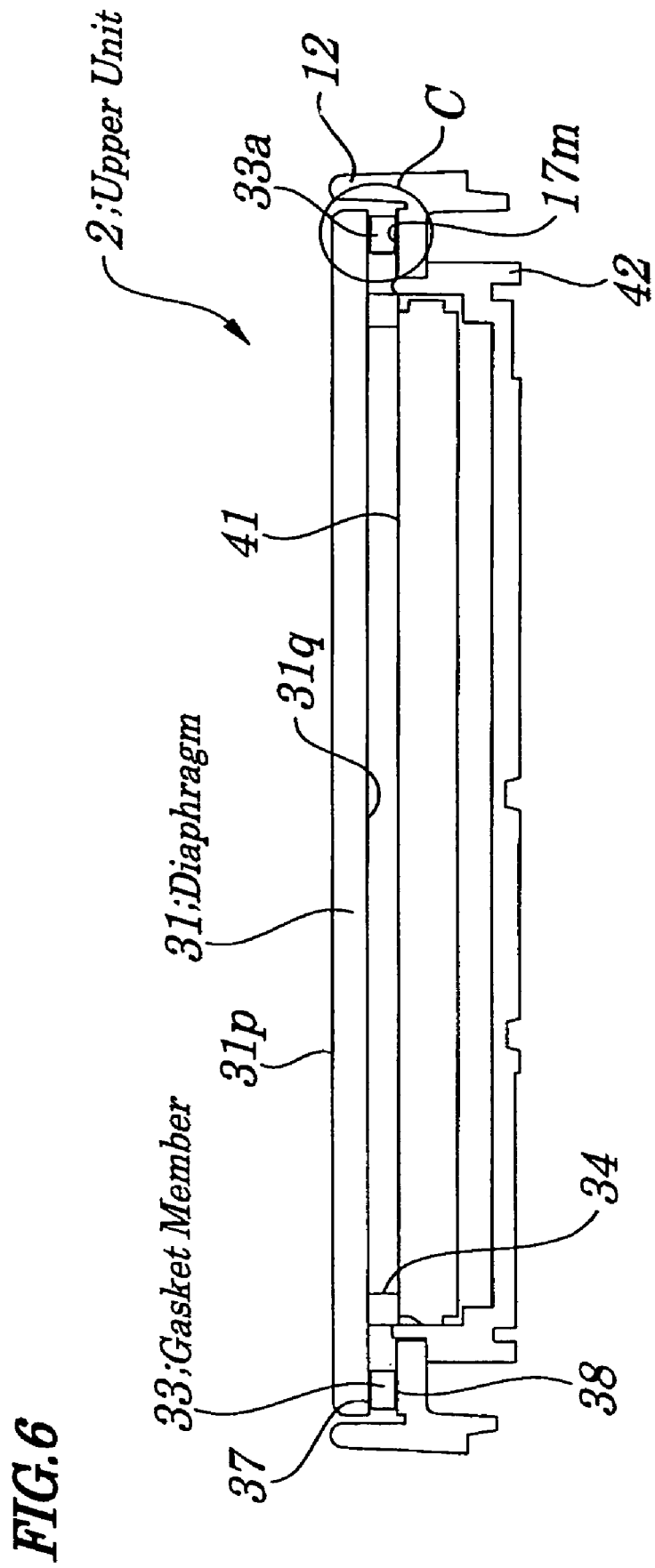
FIG. 6 is another cross-sectional view of the upper unit, taken along a line B-B of FIG. 4.
Figure 7:
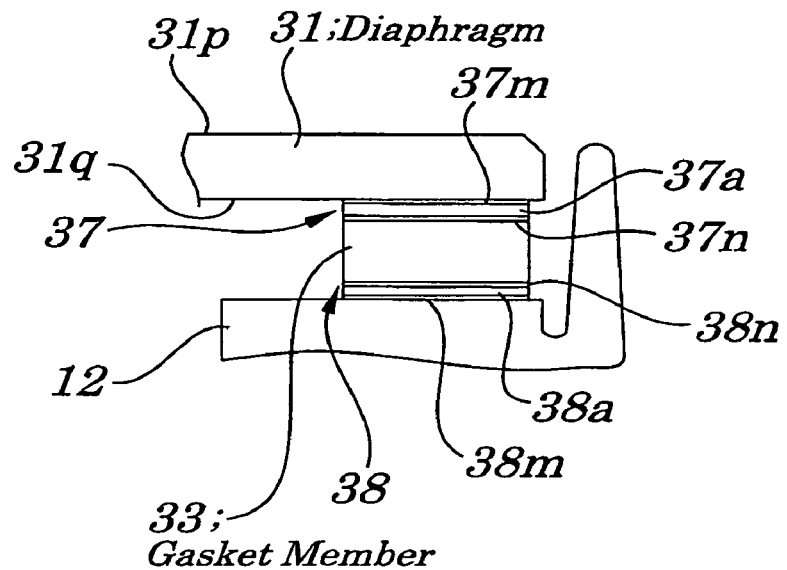
FIG. 7 is an enlarged cross-sectional view showing an enlarged C portion of FIG. 6.
Figure 8:
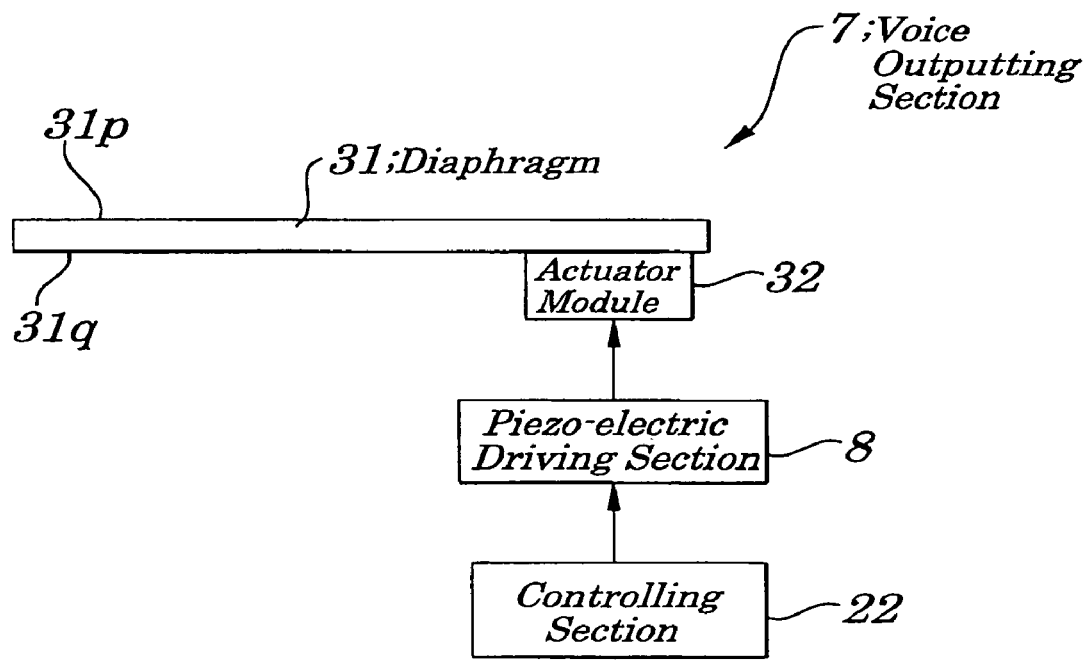
FIG. 8 is a block diagram showing configurations of a voice outputting section of the portable cellular phone according to the embodiment of the present invention.
Figure 9:
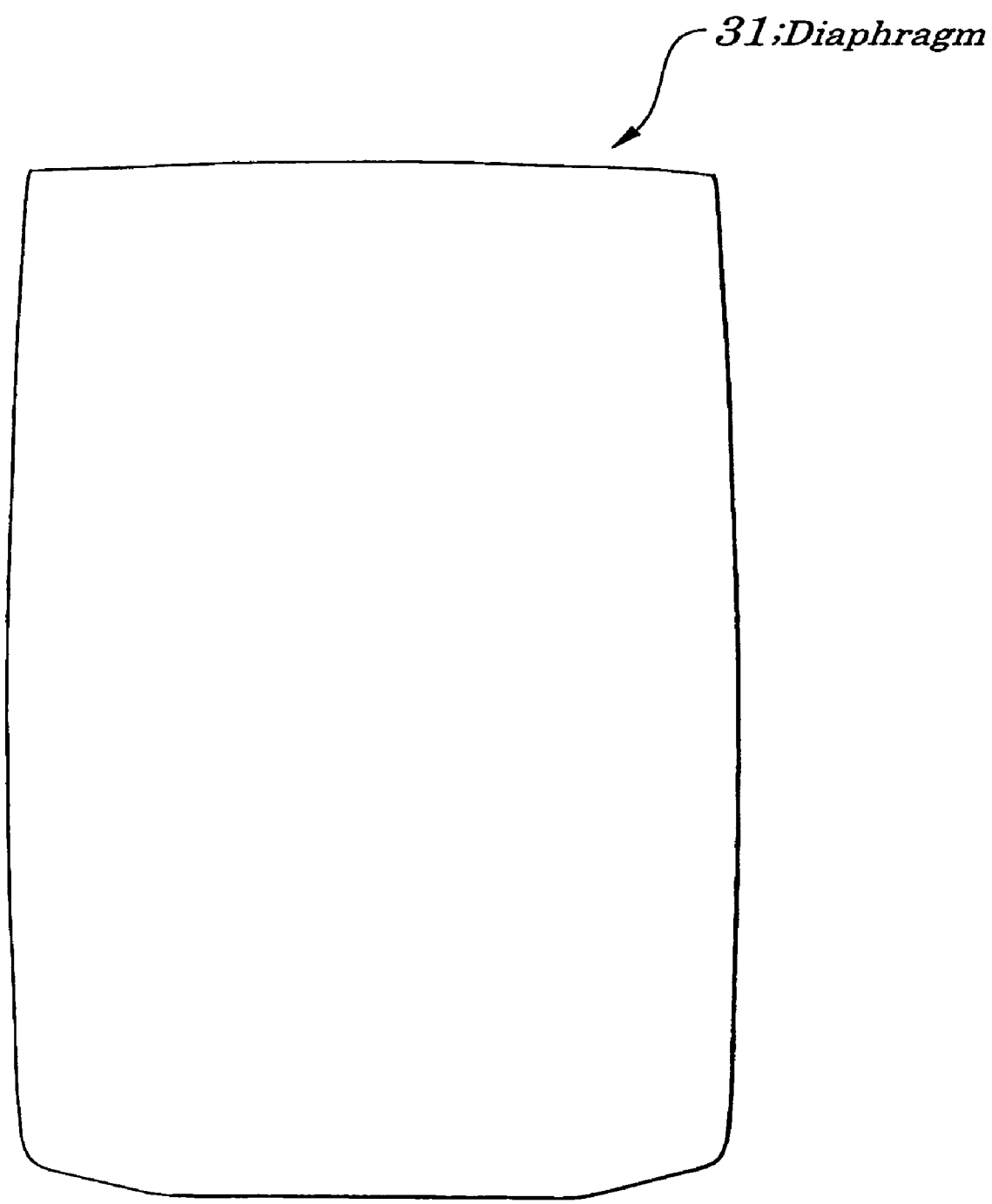
FIG. 9 is a plan view showing configurations of a diaphragm of the voice outputting section in the portable cellular phone according to the embodiment of the present invention.
Figure 10:
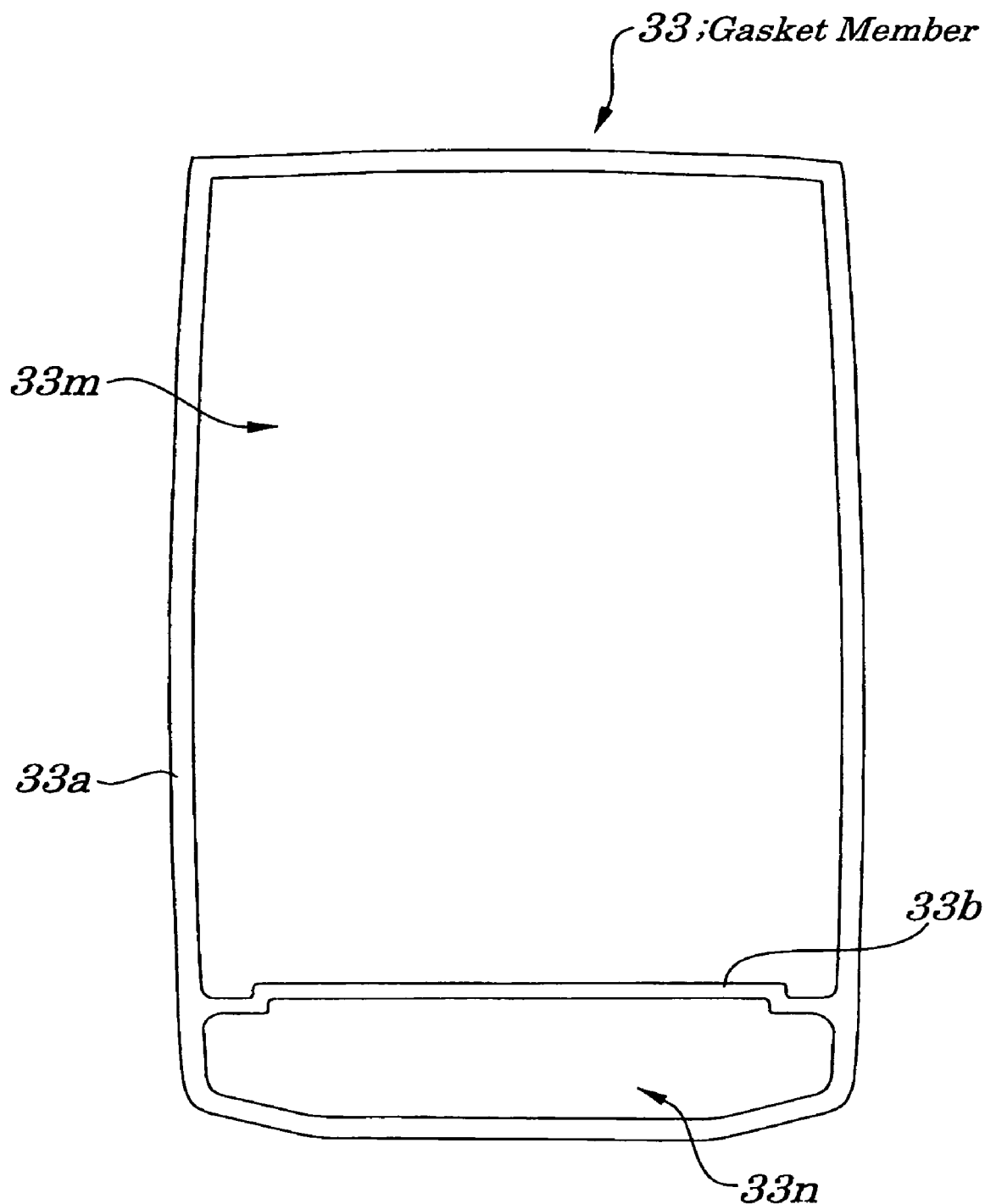
FIG. 10 is a plan view showing configurations of a gasket member of the voice outputting section in the portable cellular phone according to the embodiment of the present invention.
Figure 11:
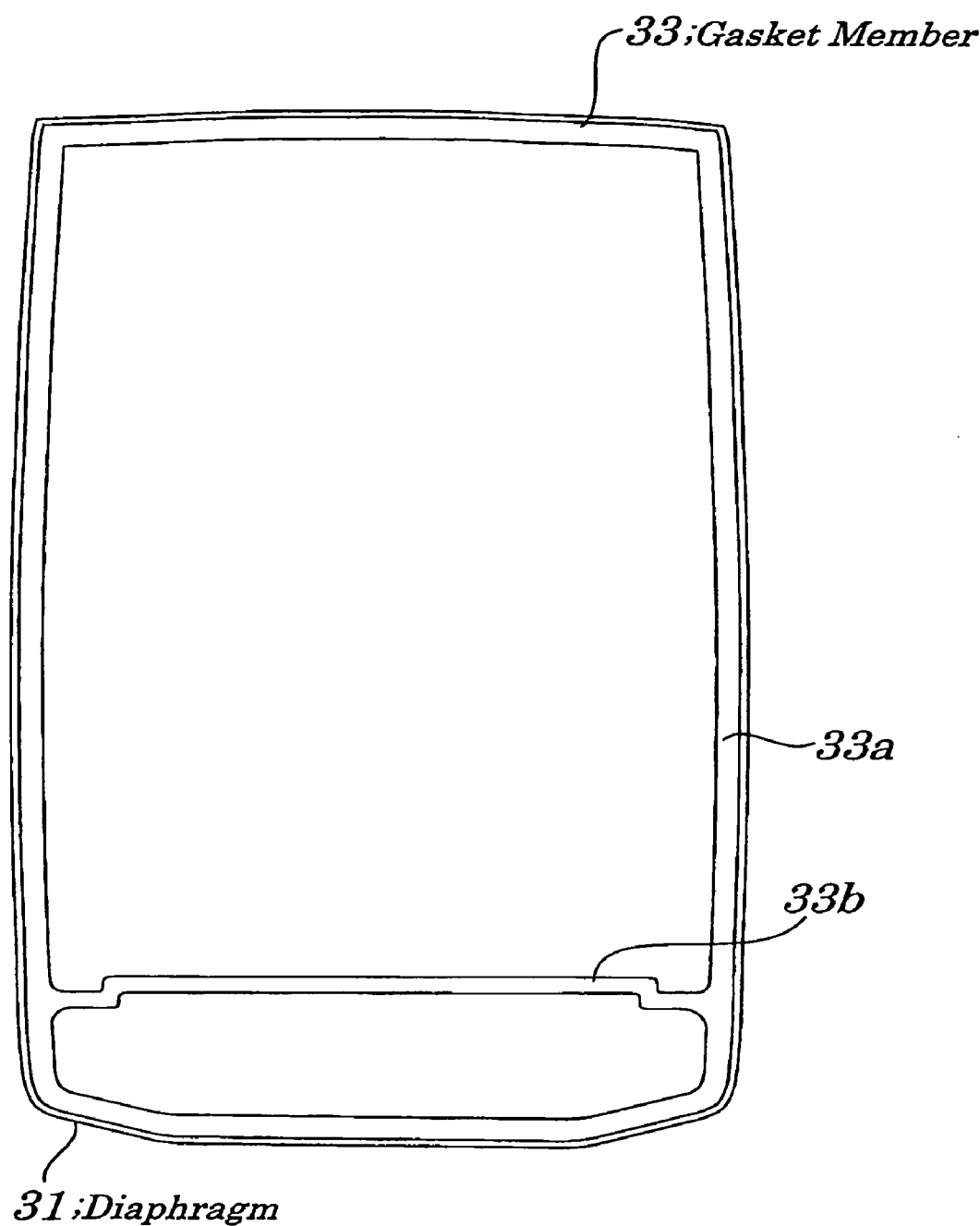
FIG. 11 is a bottom view showing a state in which the gasket member is attached to the diaphragm in the portable cellular phone according to the embodiment of the present invention.
Figure 12:
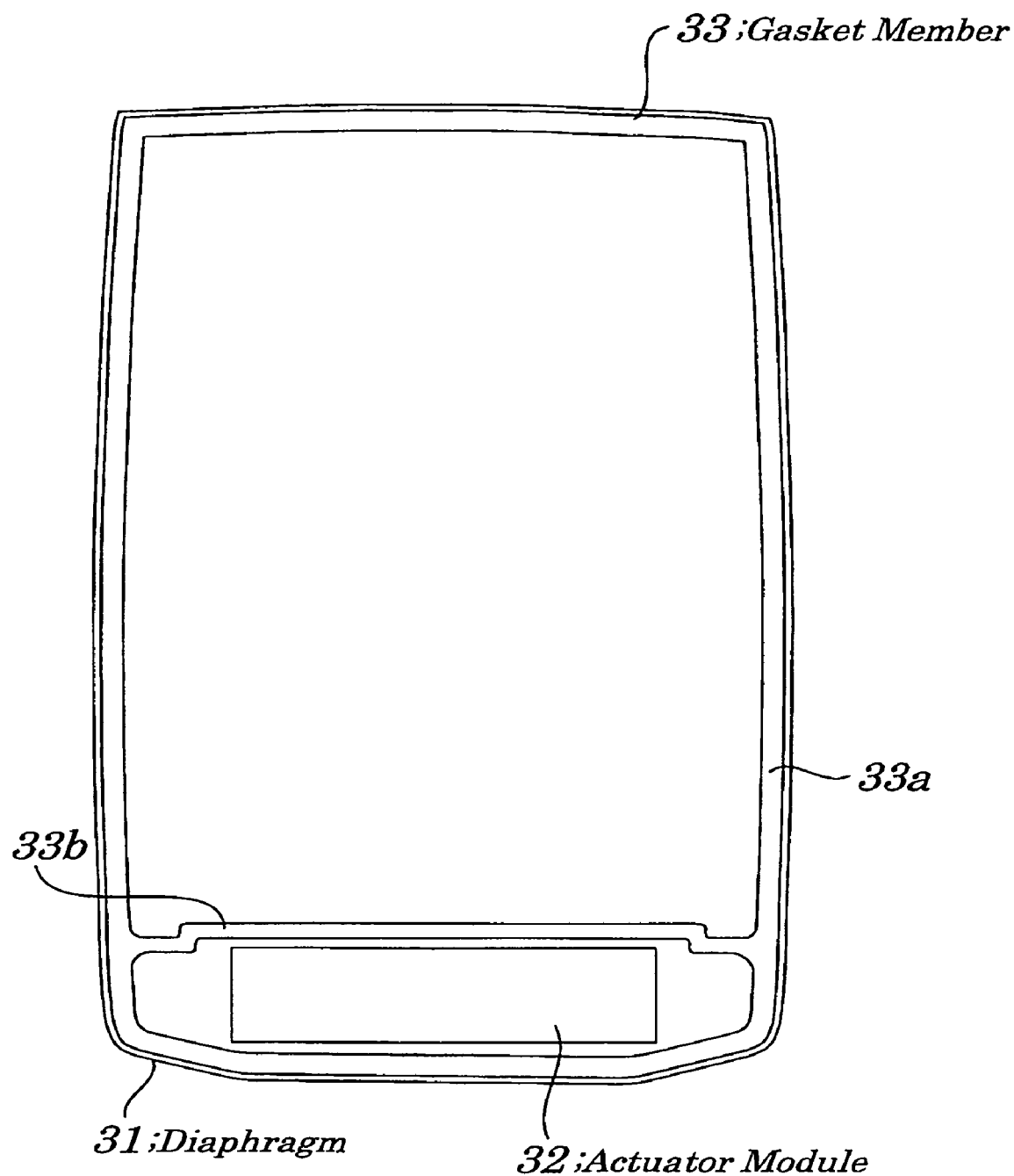
FIG. 12 is a bottom view showing a state in which the gasket member and actuator module are attached to the diaphragm in the portable cellular phone according to the embodiment of the present invention.
Figure 13:
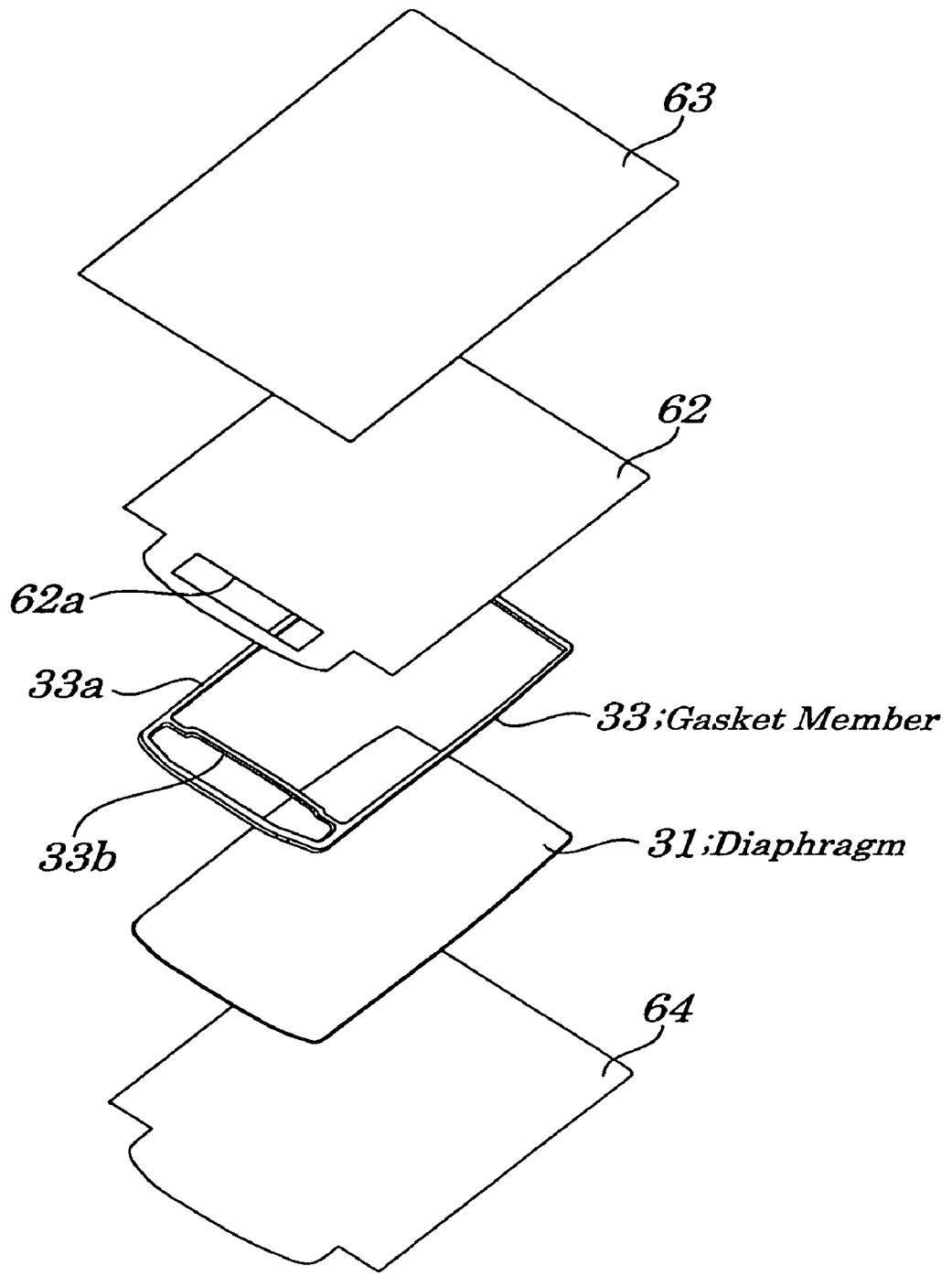
FIG. 13 is a diagram explaining a method of mounting a flat panel speaker on the cabinet of the portable cellular phone in the portable cellular phone according to the embodiment of the present invention.
Figure 14:
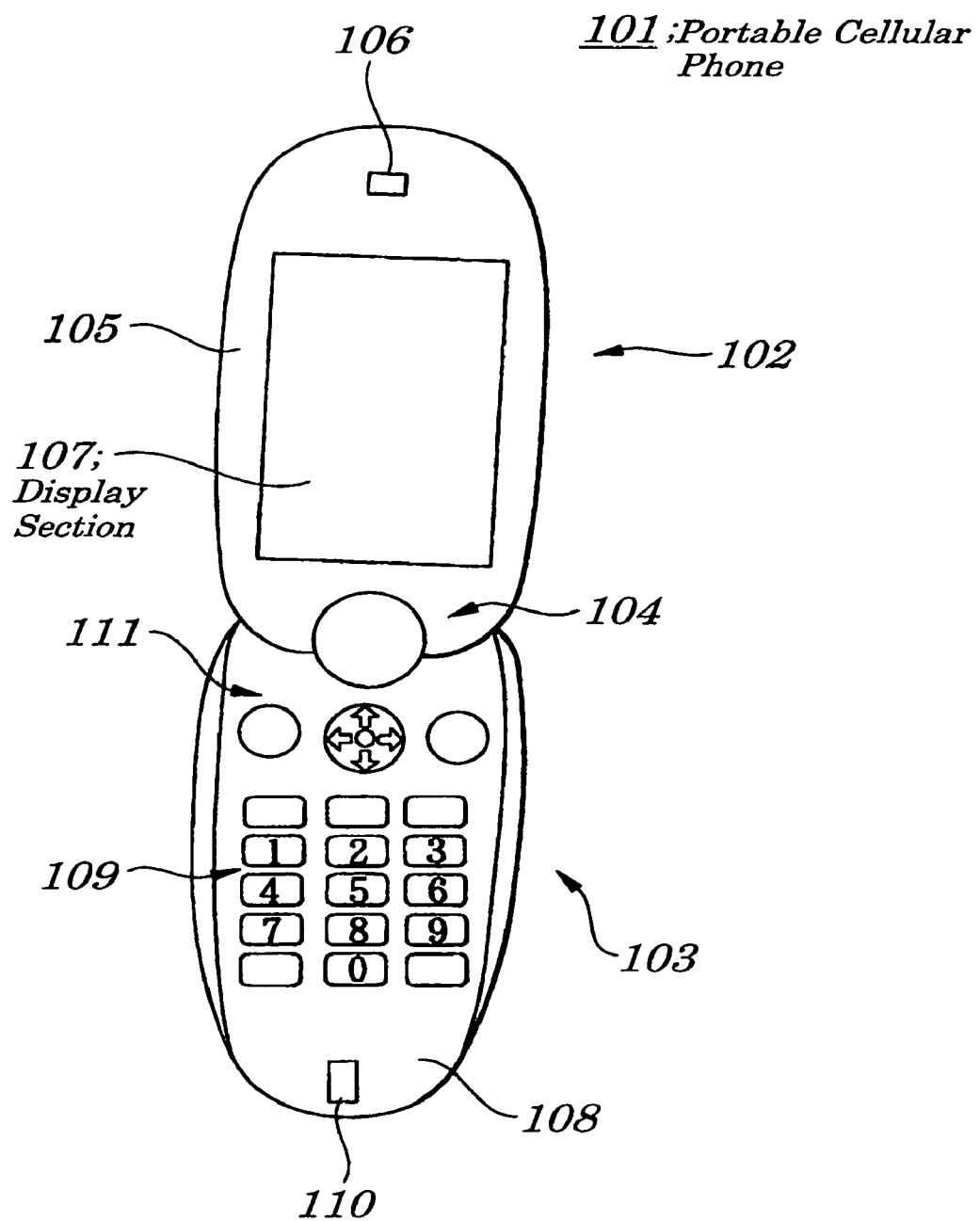
FIG. 14 is a diagram to explain conventional technology.
Figure 15:
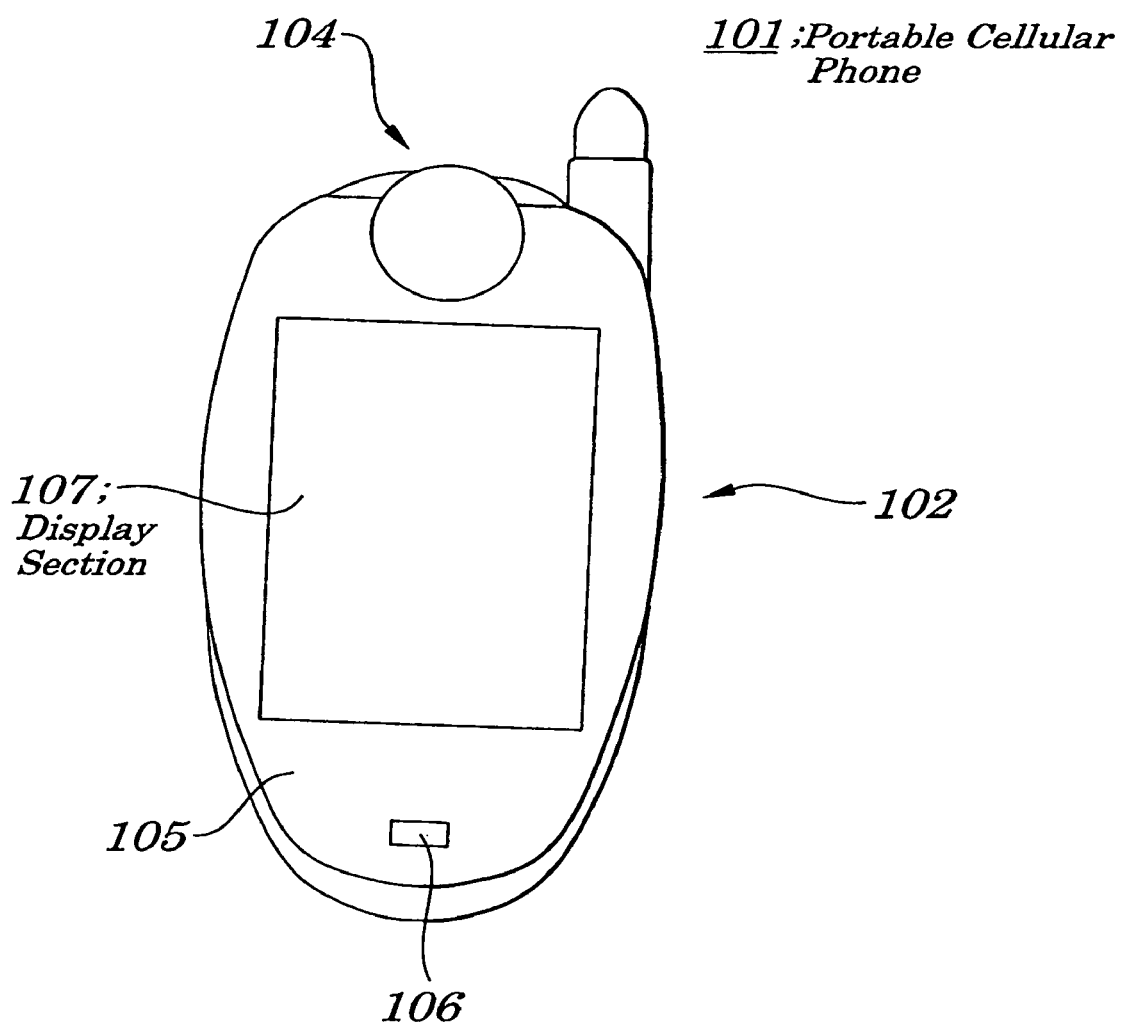
FIG. 15 is also a diagram to explain the conventional technology.
Figure 16:
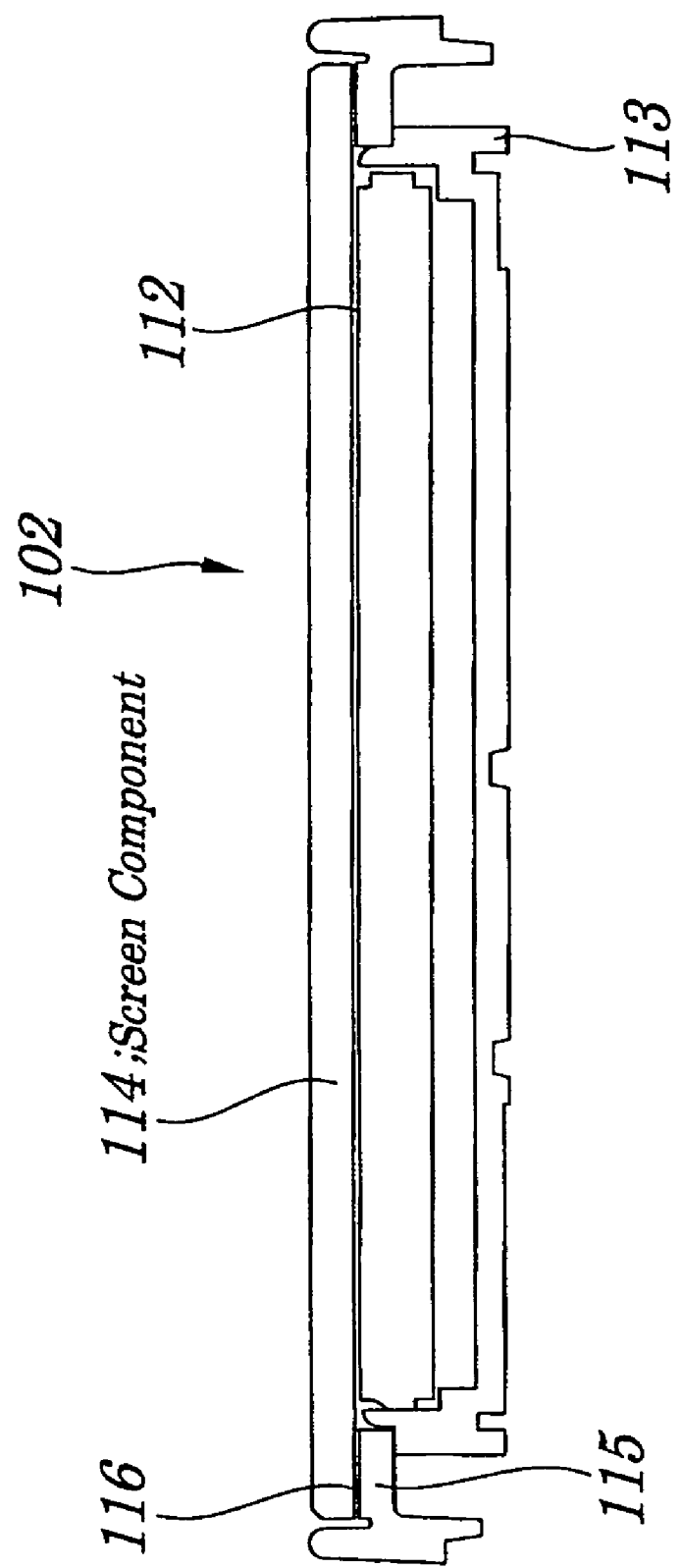
FIG. 16 is also a diagram to explain the conventional technology.
Figure 17:
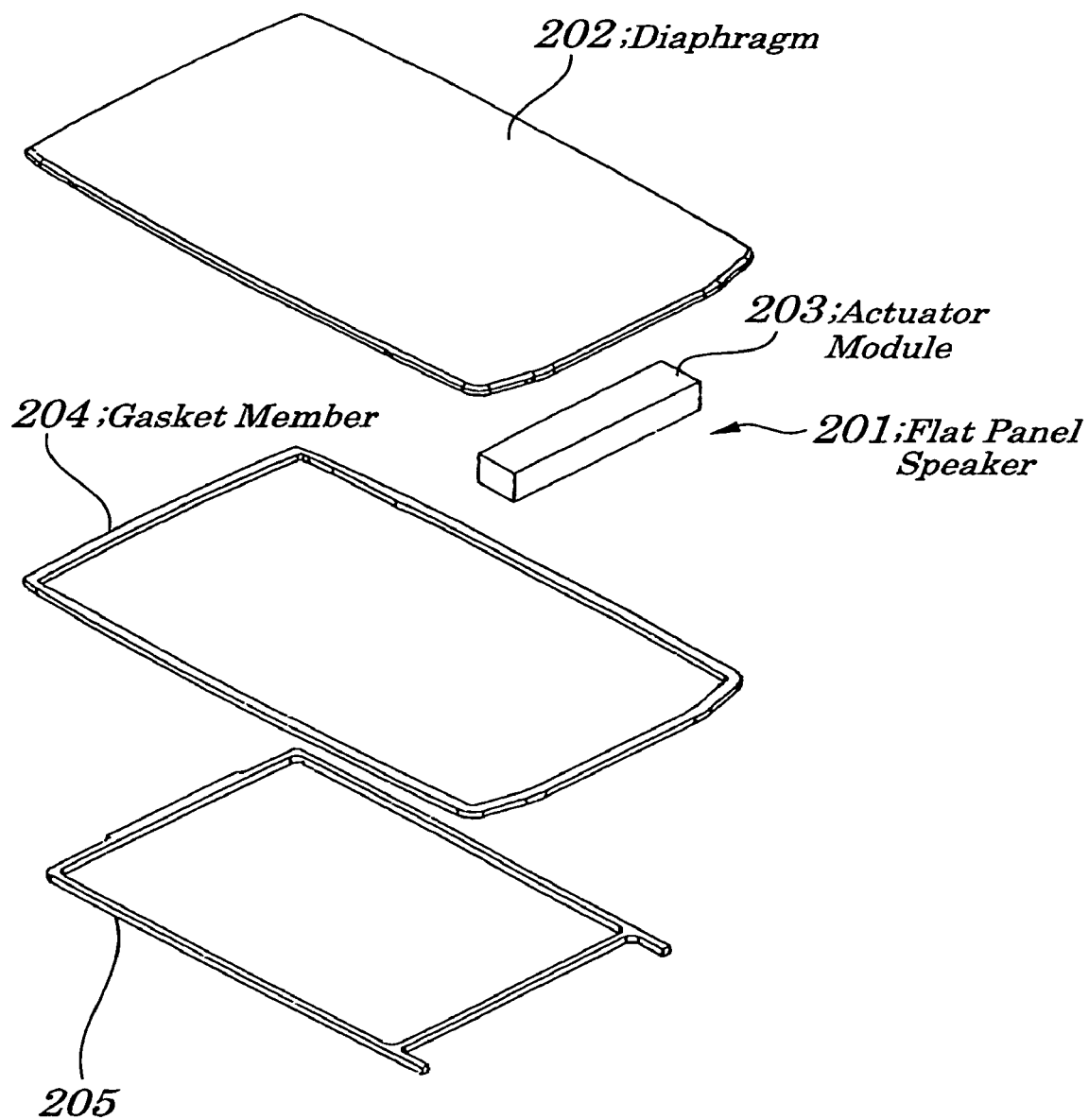
FIG. 17 is also a diagram to explain the conventional technology.

FIG. 1 is an exploded perspective view for showing configurations of an upper unit obtained by disassembling the upper unit 2 of a portable cellular phone 1 and by viewing the upper unit 2 from its surface side according to an embodiment of the present invention. FIG. 2 is another exploded perspective view showing configurations of the upper unit 2 obtained by disassembling the upper unit 2 of the portable cellular phone 1 and by viewing the upper unit 2 from its rear side according to the embodiment of the present invention. FIG. 3 is a block diagram showing configurations of the portable cellular phone 1 of the embodiment of the present invention. FIG. 4 is a plane view showing configurations of the upper unit 2 according to the portable cellular phone 1 of the embodiment. FIG. 5 is a cross-sectional view of the upper unit 2, taken along a line A-A of FIG. 4. FIG. 6 is a cross-sectional view of the upper unit 2, taken along a line B-B of FIG. 4. FIG. 7 is an enlarged cross-sectional view showing an enlarged portion C of FIG. 6. FIG. 8 is a block diagram showing configurations of a voice outputting section 7 of the portable cellular phone 1 of the embodiment. FIG. 9 is a plan view showing configurations of a diaphragm 31 of the voice outputting section 7 in the portable cellular phone 1 of the present invention. FIG. 10 is a plan view showing configurations of a gasket member 33 of the voice outputting section 7 in the portable cellular phone 1 of the present invention. FIG. 11 is a bottom view showing a state in which the gasket member 33 is attached to the diaphragm 31 in the portable cellular phone 1 of the present invention. FIG. 12 is a bottom view showing a state in which the gasket member 33 and actuator module 32 are attached to the diaphragm 31 in the portable cellular phone 1 according to the embodiment of the present invention. FIG. 13 is a diagram explaining a method of mounting a flat panel speaker 35 on an upper cabinet 6 in the portable cellular phone 1 according to the embodiment.

The portable cellular phone 1 has an original function of carrying out a telephone conversation and data communication function of allowing electronic mail to be received and transmitted and of being connected to the Internet to enable home pages to be browsed. Also, the portable cellular phone 1 is so configured as to include foldable cabinets, as shown in FIGS. 1 to 3, and that the upper unit 2 and a lower unit 3 can be opened and closed freely in conjunction with each other and that the upper unit 2 and the lower unit 3 are connected via a two-axle hinge 4 in a manner in which one unit (upper unit 2) is allowed to rotate freely relative to another unit (lower unit 4) in a portion surrounding one rotational shaft placed in a direction perpendicular to another rotational shaft for closing and opening.

The upper unit 2 is roughly configured, as shown in FIGS. 1 to 3, so as to include the voice outputting section 7 to output, for example, a receiving voice, a piezo-electric driving section 8 to drive the voice outputting section 7, a display section 9 made up of a liquid crystal display device on which a function setting screen, standby screen, or a like are displayed, and a light emitting section 11 having an LED (Light Emitting Diode) to emit light, for example, when an incoming call arrives or when a telephone conversation is carried out, all being mounted in its upper cabinet 6 making up a foldable and flat cabinet. The upper cabinet 6 is made of a die-casting formed product of, for example, alloys of magnesium and has a front case 12 making up a front side portion and a rear cover 13 making up a rear side portion. The front case 12 and the rear cover 13 are assembled in combination, in the inside of which the voice outputting section 7, the display section 9, the light emitting section 11 are housed, both being fitted in or fastened by a fixing element (fastening) such as a female screw, male screw, or a like.

The front case 12 is roughly configured so as to have a rectangular plate 15 in the central portion of which an aperture 14 to expose a display screen of the liquid crystal display panel 41 is formed with a side-wall 16 mounted in a circumferential portion of the rectangular plate 15 in a standing state. On a surface of an edge 17 of the aperture 14 placed, in a protruded state, in a side portion (in the inside portion) on an inner wall side of the side-wall 16 of the rectangular plate 15 is formed a putting-face 17m used to put the diaphragm 31 with the gasket member 33 described later being interposed between the rectangular plate 15 and diaphragm 31. Moreover, the rear cover 13 is so configured that a side wall 19 is placed in a standing manner in a portion surrounding a rectangular plate 18.

The lower unit 3 is roughly configured so that, on the foldable and flat lower cabinet are mounted, as shown in FIG. 3, a controlling section 22 to control each component making up the portable cellular phone proper 1, a storing section 23 to store processing programs to be run by the controlling section 22 and/or various data or a like, a wireless communicating section 26 to receive and transmit radio waves through an antenna 25 and to carry out a telephone conversation and data communication according to a specified protocol, an operating section 27 made up of many various operation keys to input numerals and/or characters, a microphone section 28 made up of a telephone microphone to input a transmitting voice, and a ringing-sound making section 29 to announce an incoming call at time of arrival of the incoming call.

The voice outputting section 7, as shown in FIG. 3, is made of a transparent material of, for example, an acrylic resin, and is so configured as to include the diaphragm 31 also serving as a screen component to protect the liquid crystal display panel 41, the actuator module 32 having a piezo-electric element to vibrate the diaphragm 31 to make sound waves be emitted, the gasket member 33 made of, for example, silicone rubber having a shape of a flat frame which is used to prevent the entry of a foreign matter such as dust, water, or a like into the inside of the upper cabinet 6, a dust preventing cushion component 34 made of, for example, urethane foam having a shape of a frame and being placed inside of the gasket member 33 to prevent the entry of dust into the inside which also avoid the adhesion of dust to a surface (the surface on a side which external light comes in and illuminating light fed from a backlight goes out) of the liquid crystal display panel 41. Here, the diaphragm 31 and the actuator module 32 make up the flat panel speaker 35.

The actuator module 32 receives an amplified driving signal through the piezo-electric driving section 8 to be controlled by the controlling section 22 and converts the driving signal being an electric signal into an acoustic signal to vibrate the diaphragm 31. From a surface 31p (face on a side where sound waves are emitted toward an operator or a user) of the diaphragm 31 is emitted sound waves serving as an acoustic (sonic) signal. In the embodiment, the actuator module 32 is bonded to a specified portion of a rear face 31q (face on a side being opposite to the surface 31p and is directed to the inside of the upper cabinet 6) of the diaphragm 31 by using, for example, a double-faced adhesive tape. Moreover, on the rear side of the actuator module 32 is placed a cushion material 45 to protect an FPC (Flexible Printed Circuit).

Also, a light-shielding material is applied to an external area corresponding to a display screen area of the diaphragm 31. The dust preventing cushion component 34 is placed inside (in this embodiment, within a display area 33m described later) of the gasket member 33. In the embodiment, positioning is performed on the diaphragm 31 so that a specified rectangular portion 31m of a side wall 31a strikes a corresponding corner portion 16a formed on the aperture 14 side of the side wall 16 of the front case 12 to come into physical contact and is placed on the putting-face 17m with the gasket member 33 interposed between the diaphragm 31 and the front case 12. As shown in FIGS. 6 and 7, the gasket member 33 is bonded to the diaphragm 31 by a double-faced adhesive sheet 37 and to the putting-face 17m of the front case 12 by a double-faced adhesive sheet 38.

The double-faced adhesive sheets 37 (38), as shown in FIG. 7, each includes respectively a base body 37a (38a) made of PET (polyethylene terephthalate) having an acrylic adhesive layer 37m (38m) formed on one face of the base body 37a (38a) and a silicone adhesive layer 37n (38n) formed on another face of the base body 37a (38a). The diaphragm 31 is attached to the front case 12 with the gasket member 33 interposed between the diaphragm 31 and the front case 12. The gasket member 33, with the gasket member 33 being bonded to the diaphragm 31, supports the diaphragm 31 while being deformed comparatively easily according to the vibrations of the diaphragm 31 at least along a thickness direction and prevents the entry of the foreign matter such as dust, water, or a like into the upper cabinet 6 from the aperture 14.

Moreover, the gasket member 33 has a rectangular ring-shaped frame 33a which supports a circumferential portion of the rear face 31q of the diaphragm 31 and also has a beam-shaped partitioning portion 33b bridging specified portions of the frame-like portion 33a facing each other which partitions a region being approximately rectangular when seen from a plane and being surrounded by the frame-like portion 33a into a display area 33m existing between a region where a display screen of the aperture 14 of the front case 12 is visually identified and the diaphragm 31 and a passing-through area 33n where the actuator module 32 is allowed to pass through. Outer dimensions of the gasket member 33 are set to be a little smaller than corresponding dimensions of the diaphragm 31.

In the mounting construction 36 of mounting the flat panel speaker 35 according to the embodiment, as shown in FIGS. 1 to 12, the diaphragm 31 is attached to a specified portion of the actuator module 32 so that vibrations are transferred from the actuator module 32 to the diaphragm 31 in a manner in which the diaphragm 31 strikes the actuator module 32 to come into physical contact and the diaphragm 31 is attached to the front case 12 with the gasket member 33 having the frame-like portion 33a and the partitioning portion 33b interposed between the diaphragm 31 and the front case 12. Here, the gasket member 33 is bonded to the diaphragm 31 by the frame-like double-faced adhesive sheet 37 and to the putting-face 17m of the front case 12 by the frame-like double-faced adhesive sheet 38. This enables the frame-like portion 33a of the gasket member 33 to support the diaphragm 31 without interfering with the vibrations of the diaphragm 31 and also enables the prevention of the entry of the foreign matter such as dust, water, or the like into the inside of the upper cabinet 6. Moreover, the partitioning portion 33b, as described later, prevents the foreign matter such as the dust or the like from entering, during the process of assembly, from the passing-through area 33n where the actuator module 32 is placed and the foreign matter from reaching the display area 33m side.

The display section 9 is placed on a side face of the upper cabinet 6 and is made up of, for example, a transmission liquid crystal display device. The liquid crystal display device has a liquid crystal display panel 41, a backlight (not shown) to supply illuminating light to the liquid crystal display panel 41, a driving circuit (not shown) to drive the liquid crystal display panel 41, and a holding frame 42 to hold the liquid crystal display panel 41, the backlight or a like.

The liquid crystal display panel 41 is a transmission liquid crystal display panel with a TFT (Thin Film Transistor) structure which has a TFT substrate (not shown) on which a plurality of TFTs (not shown) and transparent pixel electrodes (not shown) are formed, a facing substrate (not shown) fixed, with a clearance of several Jm between the TFT substrate and the facing substrate, in a direction opposite to the TFT in which a coloring layer (color filter) (not shown) is formed, a liquid crystal layer (not shown) sealed in the clearance, and a pair of deflectors (not shown) placed outside of the TFT substrate and the facing substrate.

The backlight has a light source unit (not shown) made up of a plurality of LEDs (Light Emitting Diodes) serving as a point source light, a light-guiding plate (not shown) to receive light emitted from the light source unit and to emit plane-shaped illuminating light to the liquid crystal display panel 41, a diffusion sheet (not shown) to correct variations in luminance, an optical component group (not shown) including a prism sheet to gather light entering from a light-guiding side and emits light illuminating light to the liquid crystal display panel 41 from its rear side to allow an observer to visually identify light transmitting through the liquid crystal display panel 41.

On a front side (diaphragm 31 side) of the holding frame 42 is placed an optical component group on which the liquid crystal display panel 41 is fixed, for example, by a frame-like double-faced adhesive sheet, with the optical component group sandwiched between the holding frame 42 and the liquid crystal display panel 41.

On the rear side (rear cover side) of the holding frame 42 is attached a printed circuit board 43 made up of specified circuit patterns formed on an insulating substrate and electronic components installed thereon and the liquid crystal display panel 41 and the light source unit are connected to the printed circuit board 43 via an FPC (not shown).

The liquid crystal display panel 41, light source unit, printed circuit board 43, or a like are housed in the upper cabinet 6 with the liquid crystal display panel 41, light source unit, printed circuit board 43, or the like being attached to the holding frame 42 in a manner to be pressed from up-and-down directions by the front case 12 and the rear cover 13 making up the upper cabinet 6 by using fastenings.

The controlling section 22 has a CPU (Central Processing Unit) or a like and executes various processing programs stored in the storing section 23 and controls each component to perform communication control processing, displaying and operating control processing, or a like, by using various registers and flags stored in the storing section 23.

The storing section 23 is made up of semiconductor memories such as a ROM (Read Only Memory), a RAM (Random Access Memory), or a like and has a program storing area in which a communication processing program to be executed by the controlling section 22, displaying and operating control processing program, browser, mailer or a like are stored and an information storing area in which various kinds of information including setting information for various functions, communication history information, telephone directory, character message information, moving picture file with voice and includes various registers and flags to be used when the controlling section 22 executes programs.

The wireless communicating section 26 is made up of an RF (Rectifier) circuit (not shown), a modulating and demodulating circuit (not shown), a baseband processing circuit (not shown), or a like and modulates a voice or data to transmit the modulated voice or data as wireless waves through the antenna 25 and receives the wireless waves through the antenna 25 to demodulate the received wireless waves to generate a voice or data which is used to carry out telephone conversations or data communication according to specified protocols.

The operating section 27 has a function key group (not shown) including a browser mode selecting key to drive a browser to browse home pages, a determining key to determine operations, a menu key to display an operation menu, an input mode switching key to switch a character inputting mode, a telephone directory key to register and/or search a telephone directory, a conversation start key to carry out a telephone conversation, a clear key to return an operational state back to a previous state by one, a power key to discontinue various operations performed by turning power ON or OFF, a cursor key to move a cursor on a display screen up-and-up and left-and-right directions and a ten-key group to input, for example, numeral characters or a like.

The two-axle hinge 4, as shown in FIGS. 1 and 2, is made up of a base plate 51 attached and fixed to the upper cabinet 6, a rotational shaft 52 supported by the base plate 51 so that a rotational shaft 52 is allowed to rotate freely whose end extrudes in parallel with the display screen of the display section 9 of the upper unit 2, and a rotational shaft 53 placed in a direction perpendicular to the rotational shaft 52 at an end of the rotational shaft 52 which allows the rotational shaft 52 to rotate freely. The upper unit 2 and lower unit 3 are folded by the rotation of the upper cabinet 6 surrounding the rotational shaft 53 relative to the lower cabinet and, while a plane containing a display face of the upper unit 2 and a plane containing an operational face of the lower unit 3 intersect each other, the upper unit 2 rotates.

Next, a method of assembling the portable cellular phone 1 according to the embodiment is described by referring to FIGS. 1 and 2, FIGS. 5 to 7, and FIGS. 11 to 13. A gasket-attached diaphragm 61 is fabricated according to the method shown in FIG. 13. First, as shown in FIGS. 7 and 11, the gasket member 33 is bonded to the circumferential portion of the rear face 31q of the diaphragm 31 using the frame-like double-faced adhesive sheet 37. Then, a separator 62 in which a passing-through hole 62a to allow the actuator module 32 to pass through is formed is bonded, by using the double-faced adhesive sheet 38 so that the passing-through hole 62a is placed on a side of the gasket member 33 being opposite to the diaphraqm 31 and so that the separator 62 can be peeled off. Moreover, a protecting sheet 63 to block the passing-through hole 62a is bonded to the rear side of the separator 62 so that the protecting sheet 63 can be peeled off. Finally, a protecting sheet 64 to protect the diaphragm 31 is bonded to the surface 31p side of the diaphragm 31 so that the protecting sheet 63 can be peeled off.

Then, as shown in FIG. 12 and 13, the actuator module 32 is attached to the diaphragm 31. That is, the protecting sheet 63 on the rear side of the gasket-attached diaphragm 61 is peeled off and the actuator module 32 is bonded, through the passing-through hole 62a of the separator 62, to a specified portion of the rear face 31q of the diaphragm 31 by using, for example, a double-bonded tape. Next, the diaphragm 31 is attached to the front case 12. That is, as shown in FIGS. 1 and 2 and FIGS. 5 to 7, the separator 62 on the rear side of the gasket-attached diaphragm 61 is peeled off and positioning is performed on the diaphragm 31 so that a specified rectangular portion 31m of the side wall face 31a strikes the corresponding corner portion 16a of the inner wall face of the side wall 16 of the front case12 to come into physical contact and the gasket member 33 is bonded to the putting-face 17m of the front case 12 by the double-faced adhesive sheet 38 and the diaphragm 31 is then attached to the front case 12.

Here, during a period from the process of attaching the actuator module 32 to the diaphragm 31 to the process of attaching the diaphragm 31 to the front case 12, the display area 33m is surrounded by the diaphragm 31, the separator 62, the rectangular ring-shaped frame 33a, and the partitioning portion 33b to come into a sealed state and, therefore, the entry of the foreign matter into the display area 33m can be prevented when the foreign matter enters from the passing-through hole 62a. As a result, it is made possible to prevent the adhesion of dust to a region corresponding to the display area 33m of the diaphragm 31 and/or to an inner wall face of the rectangular ring-shaped frame 33a and the partitioning portion 33b.

Next, on a front side of the holding frame 42 (on a side to which the diaphragm 31 is attached) is fixed the liquid crystal display panel 41 with the optical component group sandwiched between the holding frame 42 and liquid crystal display panel 41 by using, for example, a frame-like double-faced adhesive sheet. Next, the dust preventing cushion component 34 is attached to the holding frame 42 so as to be placed in the circumferential portion of the liquid crystal display panel 41. Then, the printed circuit board 43 is attached, in an overlapped state, to the rear face side of the holding frame 42 and an end of the FPC is connected to a connector placed in an end portion of the printed circuit board 43. Then, to the holding frame 42 on which the liquid crystal display panel 41, light source unit, the dust preventing cushion component 34, the printed circuit board 43, or a like is attached the front case 12 from the diaphragm 31 side.

Then, as shown in FIGS. 1 and 2, a component group including the diaphragm 31, actuator module 32, gasket member 33, or a like is mounted on the front case 12 and the actuator module 32 is connected to the printed circuit board 43 by a connector. The portable cellular phone 1 is finally assembled by attaching and fitting the rear cover 13 in or by fastening the rear cover 13 using the fixing element such as the female screw, male screw, or a like. This causes the diaphragm 31 to strike a specified portion of the actuator module 32 to come into physical contact, thus enabling the transfer of vibrations.

In the portable cellular phone 1 assembled as above, in a state in which its cabinet is opened, for example, when an incoming call arrives, the controlling section 22 controls a ringing-sound making section 29 so that a ringing-sound is generated and also controls the light emitting section 11 so that an LED emits light to make notification of an incoming call. Then, a telephone conversation is started by pressing down a conversation start key of the operating section 27 and a voice from a person with whom the telephone conversation is carried out is output from the voice outputting section 7. That is, the controlling section 22 controls the piezo-electric driving section 7 so that an amplified driving signal is fed to the actuator module 32. The actuator module 32 receives the amplified driving signal and converts the driving signal being an electric signal into an acoustic signal to vibrate the diaphragm 31. Sound waves are directly emitted from the diaphragm 31.

An operator (user) can carry out a telephone conversation without putting the diaphragm 31 on an ear; that is, the operator can hear a receiving voice and speaks toward a microphone section 28, with the portable cellular phone 1 being faced toward a front. Here, if an image (moving picture or still picture) is contained in received data, the operator can carry out a conversation while seeing the display screen of the display section 9. Moreover, when a program (moving picture with a voice) downloaded from a site is to be run, an image is displayed on the display section 9 with the cabinet being opened and a voice is emitted from the diaphragm 31 of the voice outputting section 7. When a function of reading out mail is used, a voice is emitted from the diaphragm 31. Moreover, since the gasket member 33 is so configured as to support the diaphragm 31 without interfering with the vibrations from the diaphragm 31, a voice sound is emitted reliably from the diaphragm 31, making it possible for an operator (user) to clearly hear a voice even if the portable cellular phone 1 is put comparatively apart from the operator.

Thus, according to the embodiment, during a period from the process of attaching the actuator module 32 to the diaphragm 31 to the process of attaching the diaphragm 31 to the front case 12, even with the entry of the foreign matter such as dust or a like from the passing-through port 62a, the entry of dust into the display area 33m is blocked by the partitioning portion 33b of the gasket member 33 to reliably prevent dust and, therefore, it is possible to maintain a favorable acoustic characteristic of the flat panel speaker and excellent displaying quality of a display panel. Moreover, in the process of attaching the diaphragm 31 to the front case 12 following the process of attaching the actuator module 32 to the diaphragm 31, positioning is not performed on the diaphragm 31 until the separator 62 is peeled off and, therefore, peeling and re-pasting of the protecting sheet are not required unlike in the conventional case and, therefore, rapid assembling with shortened assembling work time is made possible.

The gasket member 33 supports the diaphragm 31 without interfering with the vibration from the diaphragm 31 and, therefore, the diaphragm 31 reliably emits sound waves which an operator can hear clearly even if the portable cellular phone 1 is put comparatively apart from the operator. Also, since the operator can hear a receiving voice without putting the diaphragm 31 on an ear, with the portable cellular phone 1 being faced to a front, the operator can hear the receiving voice reliably and clearly unlike in the conventional case where a voice becomes unclear due to displacement of the diaphragm 31 from the position of a voice hole and a telephone conversation can be carried out by speaking toward the microphone section 28 even with the ear put apart from the portable cellular phone 1.

Also, when an image (moving picture or still picture) is added to data, an operator can hear a voice while seeing a display screen of the display section 9.

Furthermore, by employing the flat panel speaker, it is made possible to make the portable cellular phone 1 thin and small.

It is apparent that the present invention is not limited to the above embodiments but may be changed and modified without departing from the scope and spirit of the invention. For example, in the above embodiment, the case in which the diaphragm also serves as the screen component is described, however, the diaphragm may be used exclusively without serving as another component. In this case, it is not necessary that the diaphragm is transparent. Also, the cabinet may be made of metal or resin. In the above embodiment, the voice outputting section 7 is mounted at one place, however, may be placed at two or more places. In this case, the voice outputting section 7 may be placed on any one of the upper and lower unit.

Also, by adding an electronic camera unit, the portable cellular phone 1 may have a photographing function or video phone function. In this case, the voice outputting section 7 may produce a pseudo shutter sound at time of photographing. The portable cellular phone 1 of the present invention may be so configured that, when receiving a signal, an incoming call is output from the voice outputting section 7 with an amount of a sound calibrated. The diaphragm may be bonded directly to the gasket member by using not the double-faced adhesive but an adhesive layer or may be bonded by using a thermal welding method. The gasket member may be attached to the front case by using methods other than the adhesion method.

In the above embodiment, the case in which the rotational shaft 52 is placed in a direction parallel to a main face of the upper cabinet 6 is described, however, the rotational shaft 52 may be placed in a direction perpendicular to the main face of the upper cabinet 6. In this case, the upper unit 2 rotates in a state in which a display face of the upper unit 2 is approximately in parallel to an operating face of the lower unit 3. The present invention also may be applied not only to the two-axle type foldable portable cellular phone but also to a foldable portable cellular phone that can be simply opened or closed and to a straight type portable cellular phone other than the foldable-type one. Prevention of dust in the assembly process may be achieved by using a partitioning portion mounted on a separator instead of the partitioning portion mounted on the gasket member. Use of the cushion component 45 employed in the above embodiment may be omitted.

The present invention can be applied not only to the portable cellular phone but also to a portable electronic device such as a PHS (Personal Handy-phone System), PDA (Personal Digital Assistant), and portable computer. Also, the present invention can be applied not only to the portable electronic device but also to an acoustic device or computer having a flat panel speaker.

What is claimed is:

1. A flat panel speaker suitable for being mounted in a cabinet of an electronic device, the flat panel speaker comprising:
   a diaphragm;
   a gasket member bonded to a rear face of said diaphragm, the gasket member including a frame-like portion to support said diaphragm, and a partitioning portion bridging said frame-like portion to partition a region surrounded by the frame-like portion into a first region and a second region;
   an actuator bonded to a rear face of said diaphragm and positioned in said second region; and
   a separator having a passing-through hole receiving said actuator and removably bonded to a side of said gasket member opposite to a side where said diaphragm is placed;
   wherein said first region is sealed by said diaphragm, said separator, said frame-like portion, and said partitioning portion, such that foreign matter entering said second region through said passing-through hole is prevented from entering said first region, and wherein, when said flat panel speaker is mounted in said cabinet, said separator is removed from said gasket member and separated from said diaphragm and said actuator.

2. The flat panel speaker according to claim 1, further comprising a protecting sheet removably bonded to a surface of said diaphragm to cover said surface.

3. The flat panel speaker according to claim 1, wherein a first side of said gasket member is bonded to said rear face of said diaphragm using a first frame-like double-faced adhesive sheet and wherein said separator is bonded to a second side of said gasket member.

4. The flat panel speaker according to claim 1, wherein said gasket member supports said diaphragm while said gasket member is being deformed at least along a thickness direction according to the vibration of said diaphragm.

5. The flat panel speaker according to claim 1, wherein said actuator has a piezo-electric element.

6. The flat panel speaker according to claim 1, wherein said diaphragm is made of a transparent material.

* * * * *